United States Patent
Arai et al.

(10) Patent No.: US 11,507,987 B2
(45) Date of Patent: Nov. 22, 2022

(54) NON-TRANSITORY COMPUTER-READABLE RECORDING MEDIUM AND CHARGE CALCULATION METHOD

(71) Applicant: FUJITSU LIMITED, Kawasaki (JP)

(72) Inventors: Hiroaki Arai, Kawasaki (JP);
Masanori Yamazaki, Kawasaki (JP);
Masahiro Sato, Yokohama (JP); Yuji Wada, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 74 days.

(21) Appl. No.: 17/148,347

(22) Filed: Jan. 13, 2021

(65) Prior Publication Data
US 2021/0287265 A1 Sep. 16, 2021

(30) Foreign Application Priority Data

Mar. 16, 2020 (JP) .............................. JP2020-045049

(51) Int. Cl.
*G06F 9/455* (2018.01)
*H04L 29/08* (2006.01)
(Continued)

(52) U.S. Cl.
CPC ..... *G06Q 30/0283* (2013.01); *G06F 9/45558* (2013.01); *H04L 67/10* (2013.01);
(Continued)

(58) Field of Classification Search
CPC .......... G06Q 30/0283; G06Q 10/06375; G06F 9/45558; G06F 2009/4557;
(Continued)

(56) References Cited

U.S. PATENT DOCUMENTS 8,788,379 B1 * 7/2014 Sirota .................... G06Q 30/04
705/35
2002/0169712 A1 * 11/2002 Ginzboorg .......... H04L 12/1467
705/52
(Continued)

FOREIGN PATENT DOCUMENTS

CN 109447264 A * 3/2019 ......... G06F 9/45558
CN 107209642 B * 2/2021 ............ G06F 11/203
(Continued)

OTHER PUBLICATIONS

Extended European Search Report dated Jul. 6, 2021 for corresponding European Patent Application No. 21150703.3, 8 pages.
(Continued)

*Primary Examiner* — Emmanuel L Moise
*Assistant Examiner* — Berhanu Shitayewoldetadik
(74) *Attorney, Agent, or Firm* — Fujitsu Patent Center

(57) ABSTRACT

A charge calculation method executed by a processor included in a computer to execute a process, the process includes determining a degree of possibility that a virtual machine having redundant configuration exists in a plurality of virtual machines that provide a service, calculating a difference of charges for using the service before and after a first virtual machine among the plurality of virtual machines is migrated to an another location different from a location where the first virtual machine is located, and displaying the degree of possibility and the difference with respect to the service.

11 Claims, 29 Drawing Sheets

<DETERMINATION RULE R1>

| CONDITION | CONTENT | POSSIBILITY OF REDUNDANT CONFIGURATION |
|---|---|---|
| CONDITION R1-1 | RATIO $P_t$ IS LESS THAN 10% IN 4 OUT OF 5 TIMES | HIGH |
| CONDITION R1-2 | RATIO $P_t$ IS LESS THAN 30% IN 4 OUT OF 5 TIMES, OR RATIO $P_t$ IS LESS THAN 10% IN 2 OUT OF 5 TIMES | MEDIUM |
| CONDITION R1-3 | ANY OTHER CASE | LOW |

(51) Int. Cl.
*G06Q 30/02* (2012.01)
*G06F 15/16* (2006.01)
*H04L 12/28* (2006.01)
*H04L 12/707* (2013.01)
*H04L 29/06* (2006.01)
*H04L 67/10* (2022.01)

(52) U.S. Cl.
CPC ............. *G06F 2009/4557* (2013.01); *G06F 2009/45591* (2013.01); *G06F 2009/45595* (2013.01)

(58) Field of Classification Search
CPC . G06F 2009/45591; G06F 2009/45595; G06F 9/5088; G06F 11/2094; G06F 11/3006; G06F 11/301; G06F 11/3051; G06F 11/3409; G06F 11/1484; H04L 67/10
USPC ........................................................ 705/400
See application file for complete search history.

(56) References Cited

U.S. PATENT DOCUMENTS

| | | | | |
|---|---|---|---|---|
| 2002/0198850 A1* | 12/2002 | Grande | ............... | G06Q 30/04 705/400 |
| 2008/0184227 A1* | 7/2008 | Matsumoto | ........... | G06F 9/5077 718/1 |
| 2011/0145380 A1* | 6/2011 | Glikson et al. | ..... | G06F 9/45558 709/223 |
| 2012/0030349 A1* | 2/2012 | Sugai | ................... | G06F 9/5077 709/224 |
| 2012/0109705 A1* | 5/2012 | Belady | .................. | G06F 9/5094 705/37 |
| 2012/0173653 A1* | 7/2012 | Bland | ................... | G06F 9/4856 709/213 |
| 2012/0260248 A1* | 10/2012 | Katiyar | ................. | G06Q 40/12 718/1 |
| 2013/0055257 A1* | 2/2013 | Yamashita | ............ | G06F 9/5077 718/1 |
| 2013/0185667 A1 | 6/2013 | Harper et al. | | |
| 2013/0254081 A1* | 9/2013 | Kurabayashi | ........ | G06Q 30/04 705/30 |
| 2014/0337833 A1* | 11/2014 | Adogla | ............... | G06F 9/45558 718/1 |
| 2014/0337834 A1* | 11/2014 | Adogla | ............... | G06F 9/45558 718/1 |
| 2015/0178117 A1 | 6/2015 | Ryu et al. | | |
| 2015/0263983 A1 | 9/2015 | Brennan et al. | | |
| 2016/0154814 A1* | 6/2016 | Dawkins, Jr. et al. | ...................... | G06F 16/2365 707/690 |
| 2016/0162338 A1* | 6/2016 | Sathyamurthy | ........ | G06F 9/5077 718/1 |
| 2017/0302537 A1 | 10/2017 | Maes | | |
| 2018/0276021 A1* | 9/2018 | Ueda | ..................... | G06F 9/5027 |
| 2020/0162370 A1* | 5/2020 | Song | ..................... | H04L 45/306 |

FOREIGN PATENT DOCUMENTS

| | | | | |
|---|---|---|---|---|
| CN | 108337179 B | * | 2/2021 | ......... H04L 41/0816 |
| JP | 2012-069056 A | | 4/2012 | |
| JP | 2017-142673 A | | 8/2017 | |
| KR | 101595854 B1 | | 2/2016 | |
| WO | WO-2007136021 A1 | * | 11/2007 | ......... G06F 9/45558 |
| WO | 2016/053306 A1 | | 4/2016 | |
| WO | WO-2017051474 A1 | * | 3/2017 | ......... G06F 9/45533 |

OTHER PUBLICATIONS

Nguyen Van, Hein et al.,"Autonomic virtual resource management for service hosting platforms", 2009 ICSE Workshop on Software Engineering Challenges of Cloud Computing, IEEE, May 23, 2009, pp. 1-8, XP58210794A.

Bin, Eyal et al.,"Guaranteeing High Availability Goals for Virtual Machine Placement", 2011 31st International Conference on Distributed Computing Systems, pp. 700-709, Jun. 20-24, 2011, XP31904031A.

\* cited by examiner

FIG. 8

<DETERMINATION RULE R1>

| CONDITION | CONTENT | POSSIBILITY OF REDUNDANT CONFIGURATION |
|---|---|---|
| CONDITION R1-1 | RATIO $P_t$ IS LESS THAN 10% IN 4 OUT OF 5 TIMES | HIGH |
| CONDITION R1-2 | RATIO $P_t$ IS LESS THAN 30% IN 4 OUT OF 5 TIMES, OR RATIO $P_t$ IS LESS THAN 10% IN 2 OUT OF 5 TIMES | MEDIUM |
| CONDITION R1-3 | ANY OTHER CASE | LOW |

FIG. 10

<DETERMINATION RULE R2>

| CONDITION | CONTENT | POSSIBILITY OF REDUNDANT CONFIGURATION |
|---|---|---|
| CONDITION R2-1 | RATIO $P_b$ IS LESS THAN 10% IN 4 OUT OF 5 TIMES | HIGH |
| CONDITION R2-2 | RATIO $P_b$ IS LESS THAN 30% IN 4 OUT OF 5 TIMES, OR RATIO $P_b$ IS LESS THAN 10% IN 2 OUT OF 5 TIMES | MEDIUM |
| CONDITION R2-3 | ANY OTHER CASE | LOW |

FIG. 12

<DETERMINATION RULE R3>

| CONDITION | CONTENT | POSSIBILITY OF REDUNDANT CONFIGURATION |
|---|---|---|
| CONDITION R3-1 | RATIO $P_c$ IS LESS THAN 10% IN 4 OUT OF 5 TIMES | HIGH |
| CONDITION R3-2 | RATIO $P_c$ IS LESS THAN 30% IN 4 OUT OF 5 TIMES, OR RATIO $P_c$ IS LESS THAN 10% IN 2 OUT OF 5 TIMES | MEDIUM |
| CONDITION R3-3 | ANY OTHER CASE | LOW |

FIG. 14

<DETERMINATION RULE R4>

| CONDITION | CONTENT | POSSIBILITY OF REDUNDANT CONFIGURATION |
|---|---|---|
| CONDITION R4-1 | RATIO $P_u$ IS LESS THAN 10% IN 4 OR MORE OUT OF 5 TIMES | HIGH |
| CONDITION R4-2 | RATIO $P_u$ IS LESS THAN 30% IN 4 OR MORE OUT OF 5 TIMES, OR RATIO $P_u$ IS LESS THAN 10% IN 2 OR MORE OUT OF 5 TIMES | MEDIUM |
| CONDITION R4-3 | ANY OTHER CASE | LOW |

FIG. 16

<DETERMINATION RULE R5>

| CONDITION | CONTENT | POSSIBILITY OF REDUNDANT CONFIGURATION |
|---|---|---|
| CONDITION R5-1 | RATIO $P_d$ IS LESS THAN 10% IN 4 OUT OF 5 TIMES | HIGH |
| CONDITION R5-2 | RATIO $P_d$ IS LESS THAN 30% IN 4 OUT OF 5 TIMES, OR RATIO $P_d$ IS LESS THAN 10% IN 2 OUT OF 5 TIMES | MEDIUM |
| CONDITION R5-3 | ANY OTHER CASE | LOW |

FIG. 18

<VIRTUAL MACHINE INFORMATION>

| | STATUS | CLOUD PROVIDER | TYPE | REGION | NUMBER OF CPU | USAGE CHARGE | OS |
|---|---|---|---|---|---|---|---|
| CLOUD LOCATION R → | UPDATE | Z | nano | USA | 1 | 0.0058 | Linux |
| CLOUD LOCATION V → | UPDATE | Z | nano | UK | 1 | 0.0057 | Linux |

| SERVICE | POSSIBILITY OF REDUNDANT CONFIGURATION |
|---|---|
| A | HIGH |
| B | LOW |
| C | HIGH |
| D | MEDIUM |

SORTING

B→D→A→C

| SERVICE | TOTAL NUMBER OF RESOURCE |
|---|---|
| A | 1 |
| B | 8 |
| C | 4 |
| D | 16 |

SORTING

| SERVICE | A | B | C | D |
|---|---|---|---|---|
| CHARGE REDUCTION RATE | 35% | 5% | 5% | 15% |
| POSSIBILITY OF REDUNDANT CONFIGURATION | HIGH | LOW | HIGH | MEDIUM |

NON-TRANSITORY COMPUTER-READABLE RECORDING MEDIUM AND CHARGE CALCULATION METHOD

CROSS-REFERENCE TO RELATED APPLICATION

This application is based upon and claims the benefit of priority of the prior Japanese Patent Application No. 2020-045049 filed on Mar. 16, 2020, the entire contents of which are incorporated herein by reference.

FIELD

A certain aspect of the embodiments is related to a non-transitory computer-readable recording medium and a charge calculation method.

BACKGROUND

With the development of virtualization technology, a cloud that provides various services to a user by using virtual machines running in a data center is widespread. In the cloud, since data and programs required for the service are managed by the virtual machine, it is not necessary for the user to manage the data and the programs, and it is possible to improve the efficiency of user's business and reduce a cost.

In recent years, a new service that combines clouds from different cloud providers is also proposed. In this service, each of a plurality of virtual machines is realized by the clouds of a plurality of different cloud providers. Thereby, even if a failure occurs in any of the cloud providers, the virtual machines can continue to operate in the cloud of the remaining cloud providers, so that the virtual machines can be made redundant.

In such a service, some cloud providers may reduce the charge of their own virtual machine. In that case, a usage charge of the service becomes cheaper than a current charge by using the virtual machine after the charge reduction. Therefore, it is preferable to encourage the users of the service to migrate their virtual machine to the virtual machines of the cloud provider that reduce the charge. Note that the technique related to the present disclosure is disclosed in Japanese Patent Application Publication No. 2017-142673.

SUMMARY

According to an aspect of the present disclosure, there is provided a charge calculation method executed by a processor included in a computer to execute a process, the process including: determining a degree of possibility that a virtual machine having redundant configuration exists in a plurality of virtual machines that provide a service; calculating a difference of charges for using the service before and after a first virtual machine among the plurality of virtual machines is migrated to an another location different from a location where the first virtual machine is located; and displaying the degree of possibility and the difference with respect to the service.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a schematic diagram illustrating a determination rule according to the first example of the present embodiment;

FIG. 10 is a schematic diagram illustrating a determination rule according to the second example of the present embodiment;

FIG. 12 is a schematic diagram illustrating a determination rule according to the third example of the present embodiment;

FIG. 14 is a schematic diagram illustrating a determination rule according to the fourth example of the present embodiment;

FIG. 16 is a schematic diagram illustrating a determination rule according to the fifth example of the present embodiment;

FIG. 18 is a diagram illustrating an example of virtual machine information according to the present embodiment;

FIG. 23 is a schematic diagram illustrating an example of screen display of the display unit in the present embodiment;

DESCRIPTION OF EMBODIMENTS

For example, if respective redundant virtual machines are migrated to the same cloud provider, the respective virtual machines cannot be used in the case where the failure occurs in the cloud provider. Therefore, it makes no sense to make the virtual machines redundant. Moreover, when the user of the service voluntarily makes the virtual machines redundant, it is difficult for an administrator of the service to determine that each of the virtual machines has redundant configuration. When providing candidates for the virtual machines to be migrated to the user of the service, if the above-mentioned virtual machines that are unlikely to be migrated by the user of the service are also included in the candidates, this might prevent the user of the service from selecting the virtual machine to be migrated.

Prior to the description of the present embodiment, matters studied by an inventor will be described.

As described above, in the service that combines the plurality of cloud services, it is preferable to encourage the user to migrate a virtual machine in use to the virtual machine of the cloud provider whose usage charge is reduced, and to propose reduction in a usage charge of the service to the user.

Figure 1:
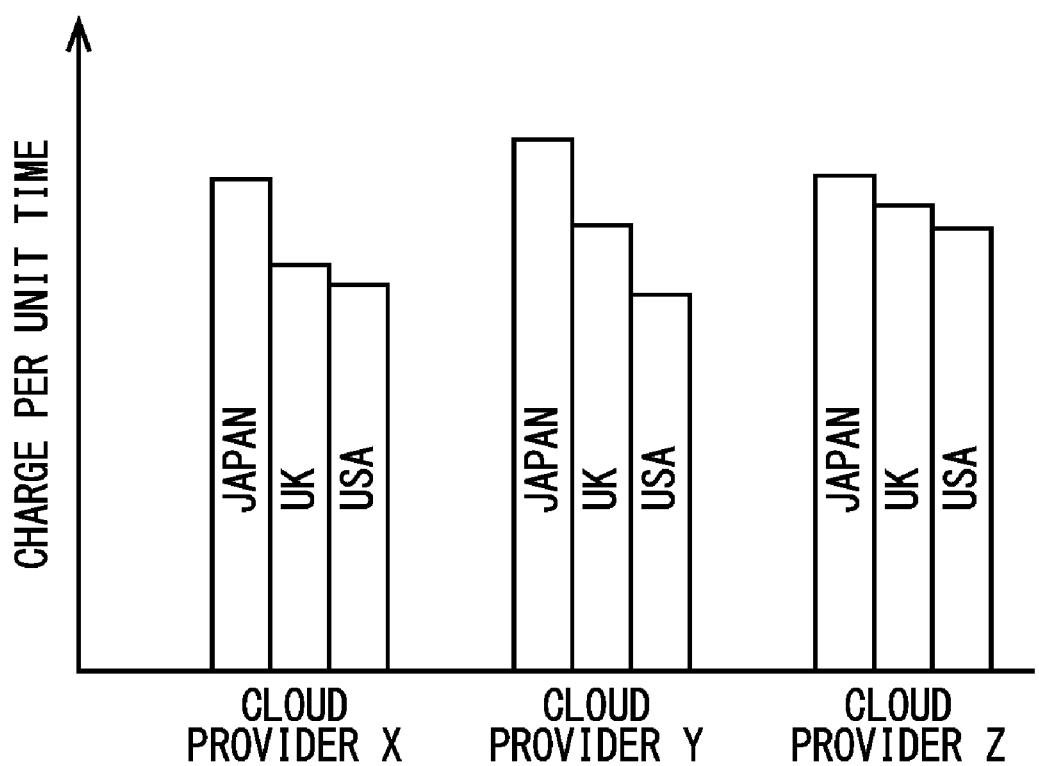
FIG. 1 is a schematic diagram illustrating a usage charge of a virtual machine per unit time for each cloud provider.

FIG. 1 is a schematic diagram illustrating the usage charge of the virtual machine per unit time for each cloud provider.

As illustrated in FIG. 1, the usage charge of the virtual machine is different for each of cloud providers X, Y, and Z. Furthermore, even if the cloud provider is the same, the usage charge of the virtual machine varies depending on a region such as Japan, United Kingdom (UK), and United States of America (USA). The region is a place where a data center in which the virtual machines are deployed is installed.

Hereinafter, the combination of each of cloud providers X, Y, Z and the region is referred to as a cloud location. The cloud locations can be expressed as (X, Japan), (Y, UK), (Z, USA) or the like, for example. Furthermore, even if the cloud provider is the same, as indicated by (X, Japan) and (X, UK), the cloud locations may be different from each other.

Figure 2:
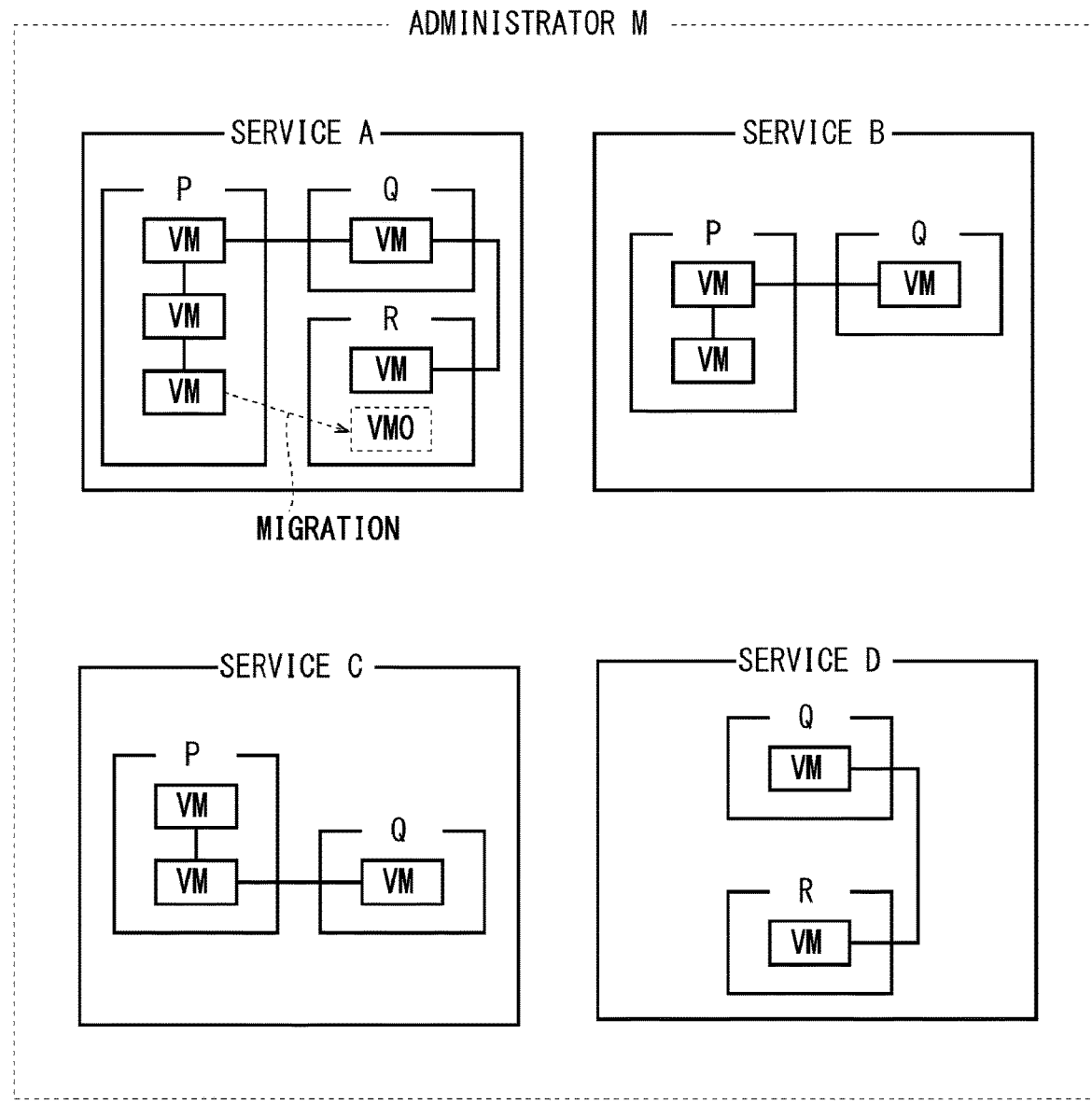
FIG. 2 is a schematic diagram of services using virtual machines deployed at different cloud locations.

FIG. 2 is a schematic diagram of services A, B, C and D using virtual machines deployed at different cloud locations P, Q and R. As an example, it is assumed that the cloud locations are P=(X, Japan), Q=(Y, UK) and R=(Z, USA).

These services A, B, C and D are managed by a same administrator M. The administrator M appropriately selects a plurality of virtual machines VM from at least two of the cloud locations P, Q, and R, connects the plurality of virtual machines by a network suitable for the service, and provides it to the user of the service.

When providing a service A to a user, for example, the administrator M selects three virtual machines VM in the cloud location P, and selects one virtual machine VM from each of the cloud locations Q and R. Then, the administrator M connects these virtual machines VM by an appropriate network.

For example, it is assumed a case where the cloud provider of the cloud location R reduces the usage charge of a virtual machine VM0. In this case, it is preferable to migrate a virtual machine having the same specifications as the virtual machine VM0 among the three virtual machines VM of the cloud location P in the service A to the virtual machine VM0 from a viewpoint of charge reduction. Here, the specifications of the virtual machine VM that serves as the reference for migration include the number of virtual CPUs, a capacity of a virtual memory and so on, in the virtual machine VM. This allows the administrator M to reduce the usage charge to the user of service A, and the cost of the service A can be reduced. The same applies to the services B, C, and D.

How much cost reduction is possible depends on a ratio of virtual machines VM having the same specifications as the virtual machine VM0 of the cloud location R whose usage charge is reduced, to the virtual machines VM included in each of the current services A, B, C, and D.

Figure 3:
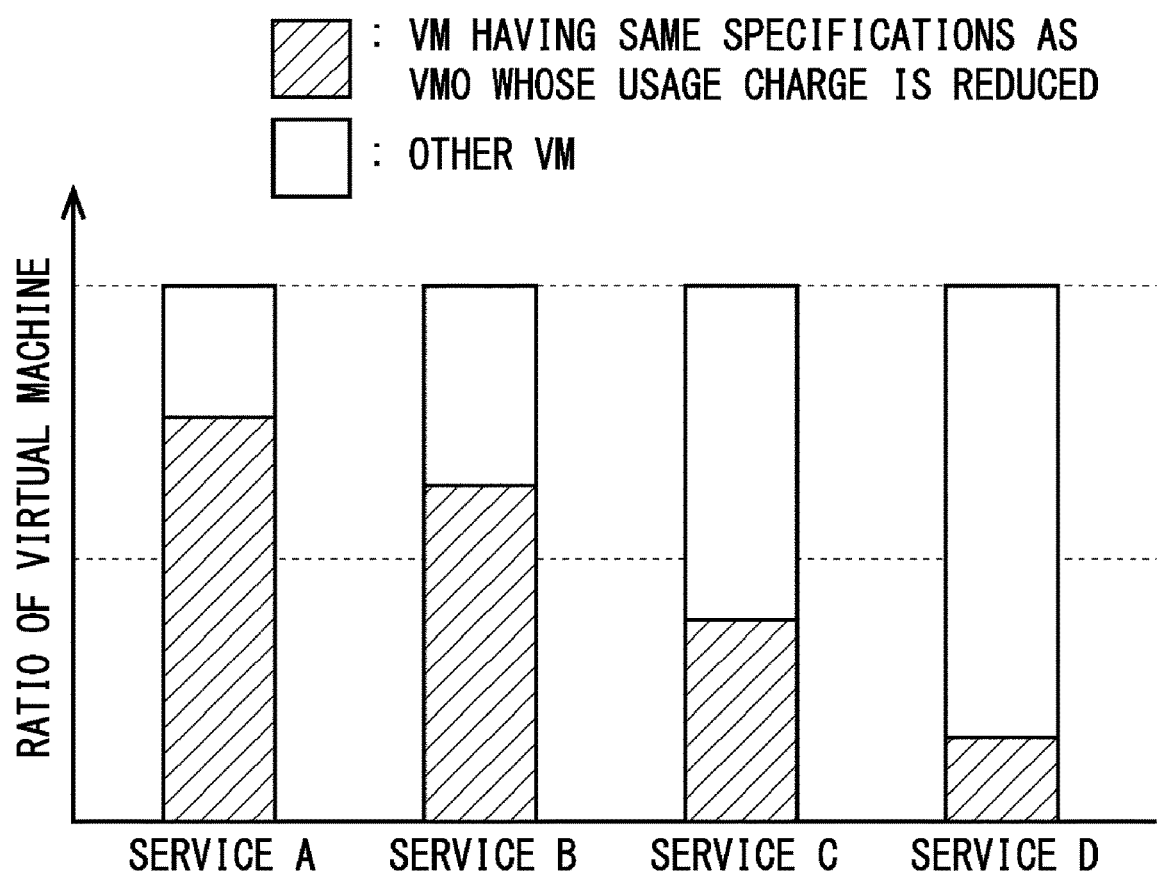
FIG. 3 is a schematic diagram illustrating a ratio of virtual machines having the same specifications as virtual machines in a cloud location whose usage charge is reduced, to virtual machines included in each of current services.

FIG. 3 is a schematic diagram illustrating the rate. In an example of FIG. 3, the service A has a maximum ratio of virtual machines having the same specifications as the virtual machine VM0 in the cloud location R to all the virtual machines.

Therefore, significant charge reduction can be realized by migrating a virtual machine having the same specifications as the virtual machine VM0 in the cloud location R among the virtual machines VM of service A, to the cloud location R.

However, when the service A includes a redundant virtual machine VM, it may be difficult to migrate the virtual machine VM as follows.

Figure 4A:
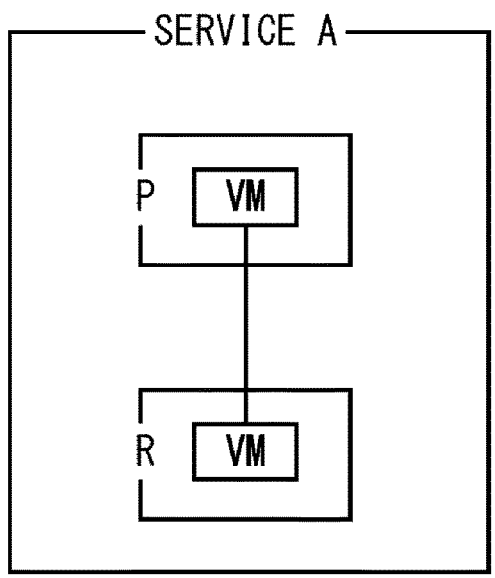
FIG. 4A is a schematic diagram of a virtual machine having redundant configuration.

FIG. 4A is a schematic diagram of a virtual machine having redundant configuration. In an example of FIG. 4A, one of the two virtual machines VM having the same function belongs to the cloud location P, and the other belongs to the cloud location R. Thereby, even if the failure occurs in the cloud location P, for example, the service A can be provided by the virtual machine VM of the cloud location R, so that the availability of the service A can be improved.

Figure 4B:
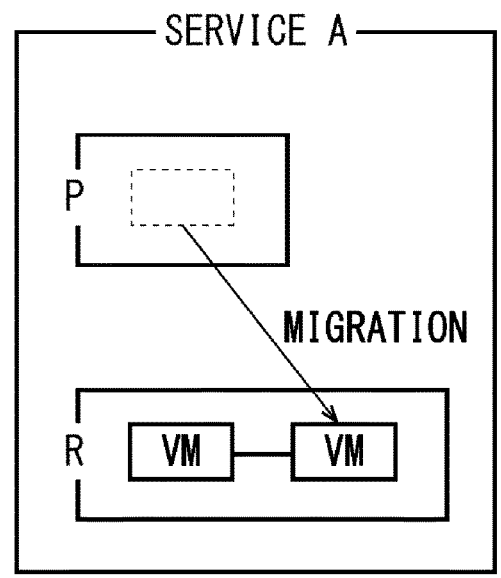
FIG. 4B is a schematic diagram illustrating a case where the virtual machine in a cloud location P is migrated to a cloud location R.

FIG. 4B is a schematic diagram illustrating a case where the virtual machine in a cloud location P is migrated to the cloud location R.

When the charge of the virtual machine VM in the cloud location R is reduced, the usage charge of the service A can be reduced by migrating the virtual machine VM in this way. Therefore, it is also considered that the administrator M of the service A calculates the charge of the service A after the charge reduction and presents it to the user of the service A.

However, in this case, both of the two virtual machines VM having the redundant configuration are deployed in the same cloud location R. Therefore, when the failure occurs in the cloud location R, the user cannot use the service A and the availability of service A is reduced.

Whether the two virtual machines VM have the redundant configuration is determined by application programs that the user of the service A runs on respective virtual machines VM. When the respective virtual machines VM run the same application programs, for example, the functions of the respective virtual machines VM are the same, and these virtual machines VMs have the redundant configuration.

However, although the administrator M of the service A knows the network configuration that connects the virtual machines VM to each other, the application programs that run on the respective virtual machines VM are not included in a category managed by the administrator M. The user of the service A can voluntarily make the virtual machines VM redundant by running the same application programs on the respective virtual machines VM. Therefore, the administrator M of the service A cannot directly determine whether each virtual machine VM has the redundant configuration.

Therefore, even if the user of the service A is encouraged to migrate the virtual machine VM to the cloud location R, it is unlikely that the user of the service A accepts it, and the calculation of a new usage charge becomes useless.

Hereinafter, each embodiment capable of eliminating such uselessness is described.

EMBODIMENT

Figure 5:
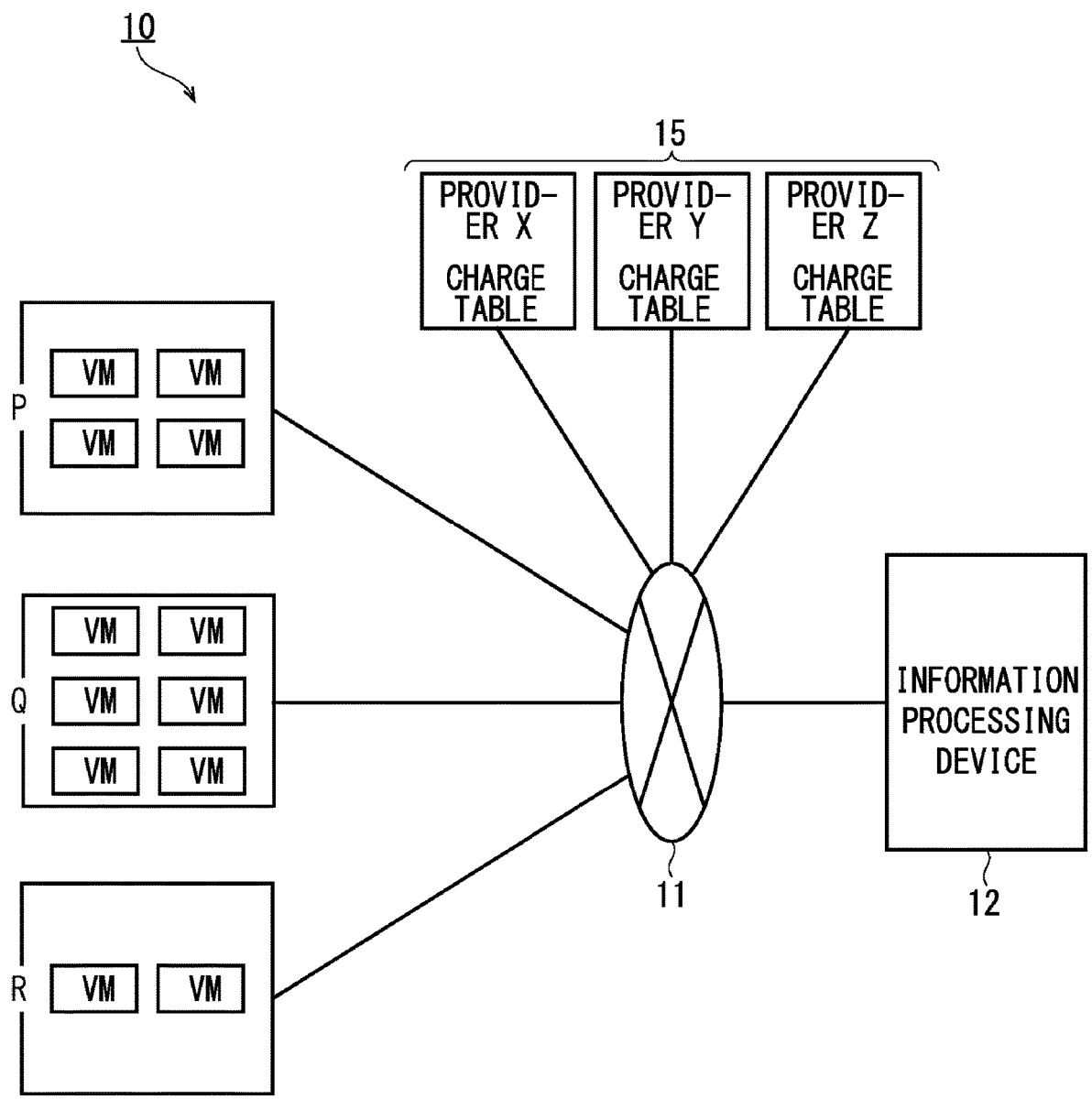
FIG. 5 is a system configuration diagram of a system according to a present embodiment.

FIG. 5 is a system configuration diagram of a system according to a present embodiment. A system 10 calculates a difference in usage charges for using the service before and after migrating the virtual machine VM to another cloud location, in the service using the virtual machines VM deployed in the cloud locations P, Q, and R. In this example, the system 10 has an information processing device 12 connected to the cloud locations P, Q, and R via a network 11. As described above, also in the present embodiment, the combination of any of the cloud providers X, Y, Z and the region is referred to as the cloud location P, Q or R. The cloud locations are P=(X, Japan), Q=(Y, UK) and R=(Z, USA), for example.

The information processing device 12 is a computer such as a server or a PC (Personal Computer), and accesses charge information 15 of the cloud providers X, Y, and Z via the network 11. The charge information 15 is a web page in which charge tables of the virtual machine VM in the respective cloud locations P, Q, and R are described. The information processing device 12 can detect whether the usage charge of the virtual machine VM in each of the cloud locations P, Q, and R is reduced, by referring to the charge information 15.

Figure 6:
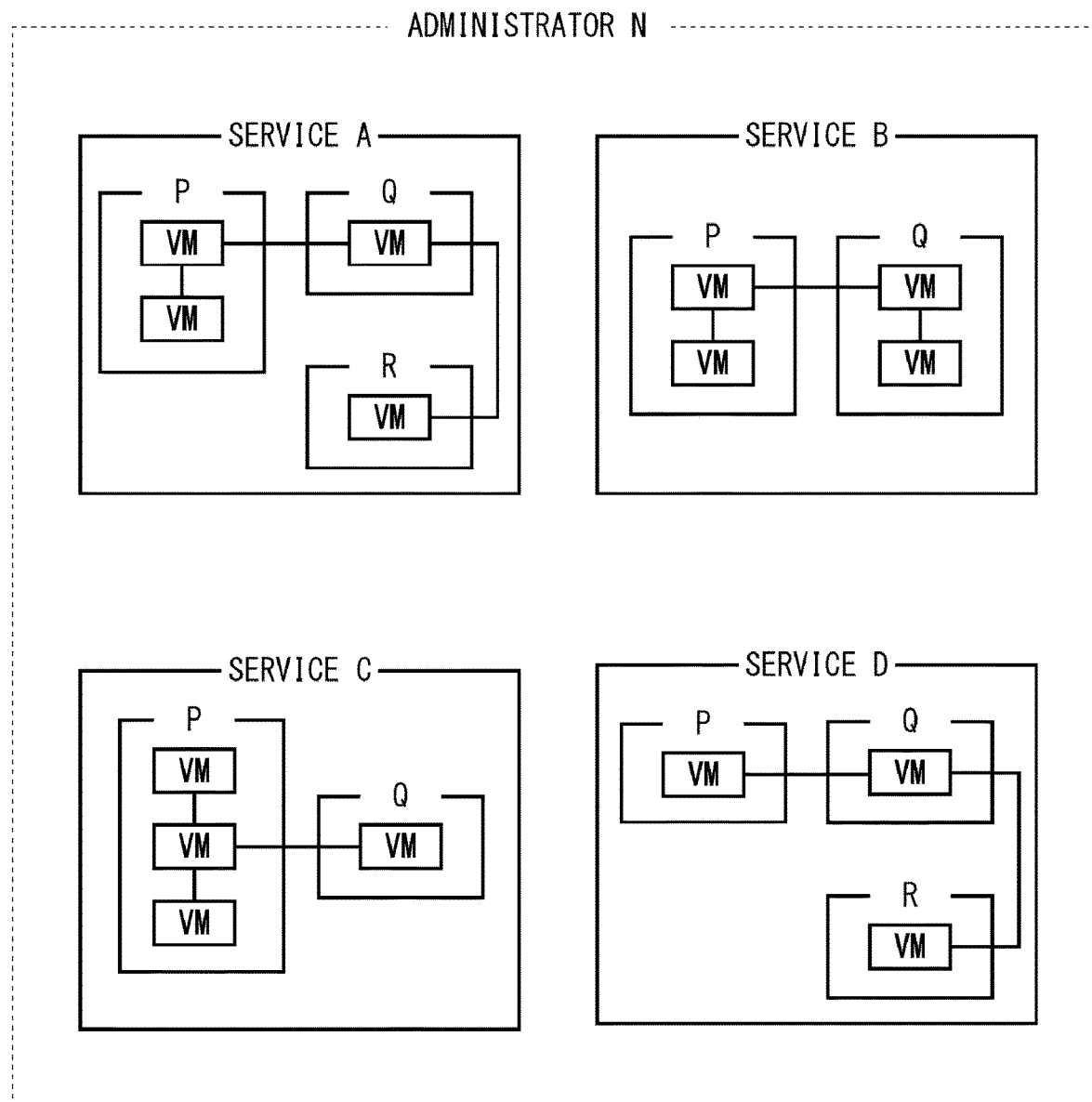
FIG. 6 is a schematic diagram of services using virtual machines deployed in cloud locations in the present embodiment.

FIG. 6 is a schematic diagram of services A, B, C and D using virtual machines deployed in cloud locations P, Q and R.

The administrator N of the system 10 described above manages the cloud locations where the respective virtual machines VM in the services A, B, C, and D are deployed and the network for connecting the respective virtual machines VM.

However, the administrator N does not manage whether each virtual machine VM has the redundant configuration. Furthermore, each user of the services A, B, C, and D can freely run the application programs on the virtual machines VM, and the administrator N does not have an authority to manage the application programs. Therefore, even if the user runs the same application programs on the two virtual machines VM and makes these virtual machines VM redundant, the administrator N cannot directly know the redundant configuration.

Therefore, in the present embodiment, the information processing device 12 determines a possibility that the virtual machine VM has the redundant configuration as follows. The determination method of the redundant configuration includes the following first to fifth examples.

First Example

Figure 7A:
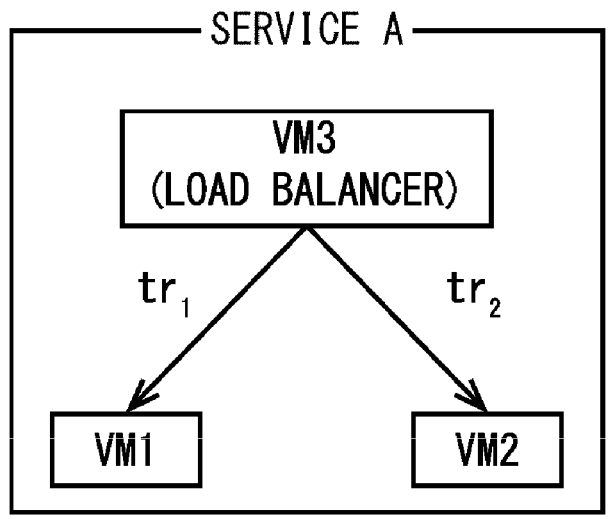
FIG. 7A is a schematic diagram illustrating a determination method according to a first example of the present embodiment.

FIG. 7A is a schematic diagram illustrating a determination method according to the first example. Hereinafter, a plurality of virtual machines VM that provide service A are referred to as virtual machines VM1, VM2, and VM3. The virtual machines VM1, VM2, and VM3 may be deployed in the same cloud location, or may be deployed in different cloud locations. Further, the services B, C, and D may be used instead of the service A. This also applies to the second and third examples described later.

In this example, when there are two virtual machines VM1 and VM2 under the control of a single virtual machine VM3, the information processing device 12 monitors traffic volumes $tr_1$ and $tr_2$ input to these virtual machines VM1 and VM2, respectively. Note that the traffic volumes $tr_1$ is an example of a first traffic volume, and the traffic volumes $tr_2$ is an example of a second traffic volume.

If the virtual machines VM1 and VM2 have the redundant configuration, the virtual machine VM3 has a high possibility to function as a load balancer that distributes traffic to the virtual machines VM1 and VM2. Therefore, there should be no large difference between the traffic volumes $tr_1$ and $tr_2$.

Therefore, in this example, the information processing device 12 monitors the traffic volumes $tr_1$ and $tr_2$ to determine a degree of possibility that the virtual machines VM1 and VM2 have the redundant configuration.

Figure 7B:
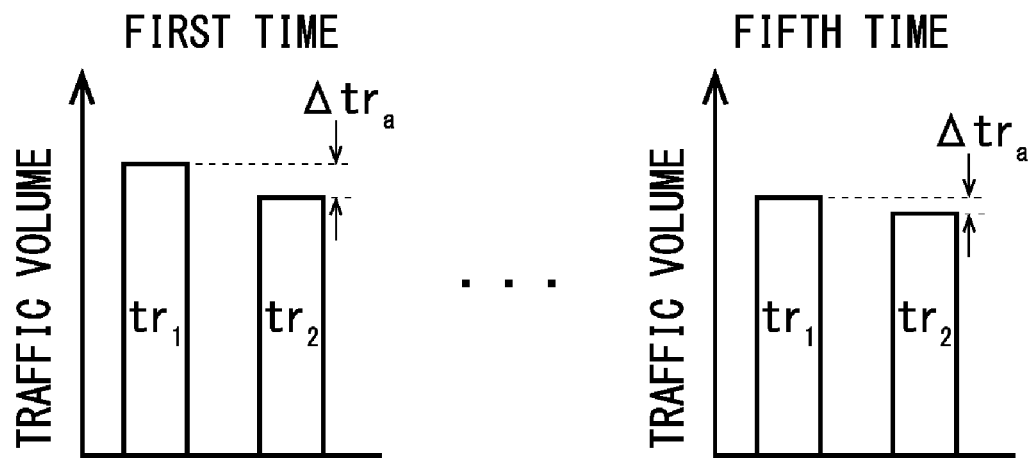
FIG. 7B is a schematic diagram illustrating a monitoring result of traffic volumes in the first example.

FIG. 7B is a schematic diagram illustrating a monitoring result of the traffic volumes $tr_1$ and $tr_2$ in the first example.

In this example, total volumes (bits) of traffic in one minute are set as the traffic volumes $tr_1$ and $tr_2$, and the information processing device 12 calculates a difference $\Delta tr_a$ between them. Then, the information processing device 12 determines the degree of possibility of the redundant configuration based on a ratio $P_t (=\Delta tr_a/tr_1)$ occupied by the difference $\Delta tr_a$ to the traffic amount $tr_1$.

FIG. 8 is a schematic diagram illustrating a determination rule R1 for determining the degree of possibility.

In the determination rule R1, the information processing device 12 determines the degree of possibility depending on which of the conditions "R1-1", "R1-2", and "R1-3" is satisfied, as illustrated in FIG. 8.

Here, the information processing device 12 measures the traffic volumes $tr_1$ and $tr_2$ 5 times. When the ratio $P_t$ is less than 10% in 4 out of 5 times, the condition "R1-1" is satisfied, and the information processing device 12 determines that there is a high possibility of the redundant configuration.

When the ratio $P_t$ is less than 30% in 4 out of 5 times, or the ratio $P_t$ is less than 10% in 2 out of 5 times, the condition "R1-2" is satisfied, and the information processing device 12 determines that there is a medium possibility of the redundant configuration.

In any other cases, the condition "R1-3" is satisfied, and the information processing device 12 determines that there is a low possibility of the redundant configuration.

Second Example

Figure 9A:
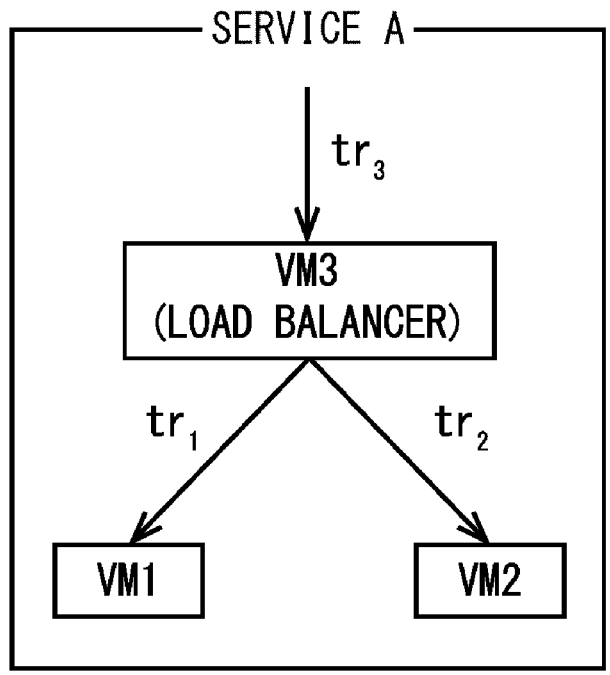
FIG. 9A is a schematic diagram illustrating a determination method according to a second example of the present embodiment.

FIG. 9A is a schematic diagram illustrating a determination method according to the second example. In this example, it is assumed a case where there are the two virtual machines VM1 and VM2 under the control of the single virtual machine VM3 in the service A. In this case, the information processing device 12 monitors an input traffic volume $tr_3$ input to the virtual machine VM3 and output traffic volumes $tr_1$ and $tr_2$ output from the virtual machine VM3 to the virtual machines VM1 and VM2.

If the virtual machines VM1 and VM2 have the redundant configuration, the virtual machine VM3 has the high possibility to function as the load balancer that distributes traffic to the virtual machines VM1 and VM2. In this case, virtual machine VM3 distributes input data to its own virtual machine to each virtual machine VM1 and VM2 at random in time. Therefore, a total value mot of the output traffic volumes $tr_1$ and $tr_2$ is equal to the input traffic volume $tr_3$.

Therefore, in this example, the information processing device 12 monitors the traffic volumes $tr_1$, $tr_2$, and $tr_3$ to determine the degree of possibility that the virtual machines VM1 and VM2 have the redundant configuration.

Figure 9B:
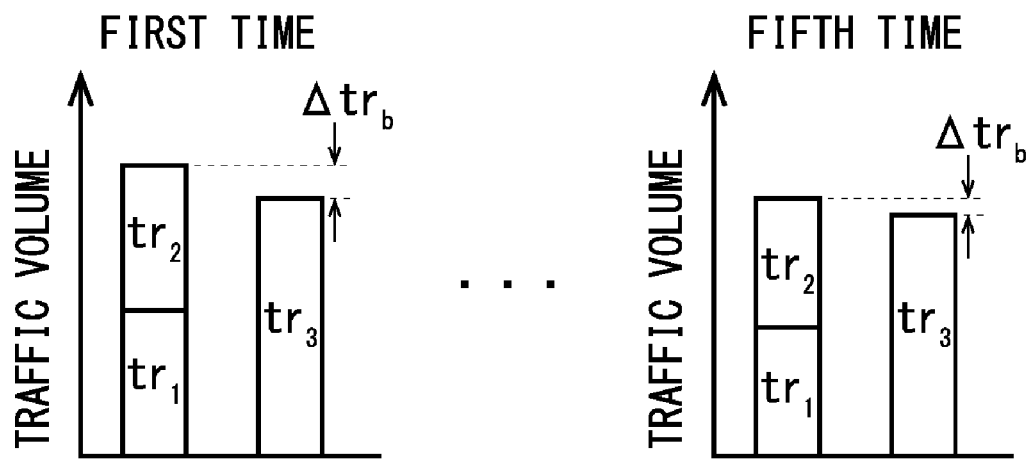
FIG. 9B is a schematic diagram illustrating a monitoring result of the traffic volumes in the second example.

FIG. 9B is a schematic diagram illustrating a monitoring result of the traffic volumes $tr_1$, $tr_2$, and $tr_3$.

In this example, the total volumes (bits) of traffic in one minute are set as the traffic volumes $tr_1$, $tr_2$ and $tr_3$. The information processing device 12 calculates a difference $\Delta tr_b$ between the total value $tr_{tot}$ of the output traffic volumes $tr_1$ and $tr_2$ and the input traffic volume $tr_3$. Further, the information processing device 12 determines the degree of possibility of the redundant configuration based on a ratio $P_b(=\Delta tr_b/tr_3)$ occupied by the difference $\Delta tr_b$ to the input traffic volume $tr_3$.

FIG. 10 is a schematic diagram illustrating a determination rule R2 for determining the degree of possibility.

In the determination rule R2, the information processing device 12 determines the degree of possibility depending on which of the conditions "R2-1", "R2-2", and "R2-3" is satisfied, as illustrated in FIG. 10.

Here, the information processing device 12 measures the traffic volumes $tr_1$, $tr_2$ and $tr_3$ 5 times. When the ratio $P_b$ is less than 10% in 4 out of 5 times, the condition "R2-1" is satisfied, and the information processing device 12 determines that there is the high possibility of the redundant configuration.

When the ratio $P_b$ is less than 30% in 4 out of 5 times, or the ratio $P_b$ is less than 10% in 2 out of 5 times, the condition "R2-2" is satisfied, and the information processing device 12 determines that there is the medium possibility of the redundant configuration.

In any other cases, the condition "R2-1" is satisfied, and the information processing device 12 determines that there is the low possibility of the redundant configuration.

Third Example

Figure 11A:
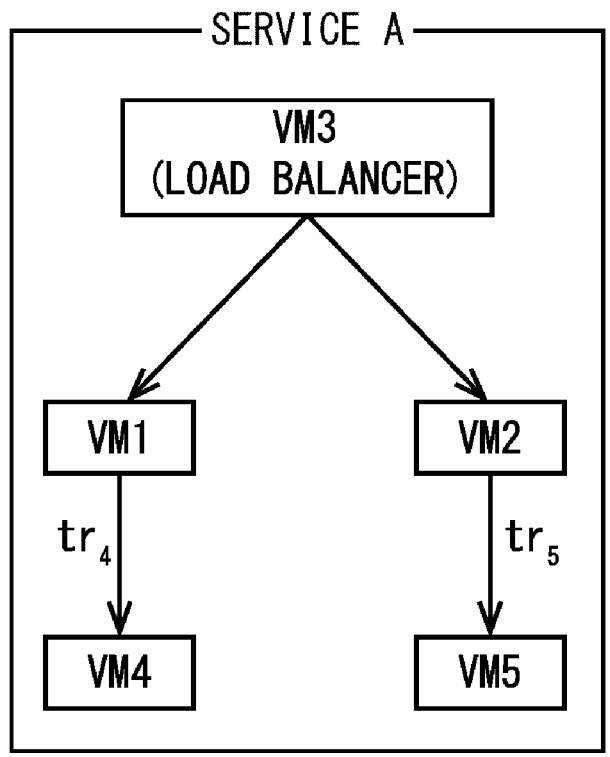
FIG. 11A is a schematic diagram illustrating a determination method according to a third example of the present embodiment.

FIG. 11A is a schematic diagram illustrating a determination method according to the third example. In FIG. 11A, it is assumed a case where the high possibility that the virtual machines VM1 and VM2 in the service A have the redundant configuration, by the first example and the second example, is determined. In this case, there is a high possibility that virtual machines VM4 and VM5 in the service A under the control of the virtual machines VM1 and VM2 also have the redundant configuration.

In order to confirm this, the information processing device 12 monitors a traffic volume $tr_4$ flowing between the virtual machine VM1 and the virtual machine VM4 and a traffic volume $tr_5$ flowing between the virtual machine VM2 and the virtual machine VM5. If the virtual machines VM4 and VM5 have the redundant configuration, there should be no large difference between the traffic volumes $tr_4$ and $tr_5$.

Therefore, in this example, the information processing device 12 monitors the traffic volumes $tr_4$ and $tr_5$ to determine the degree of possibility that the virtual machines VM4 and VM5 have the redundant configuration.

Figure 11B:
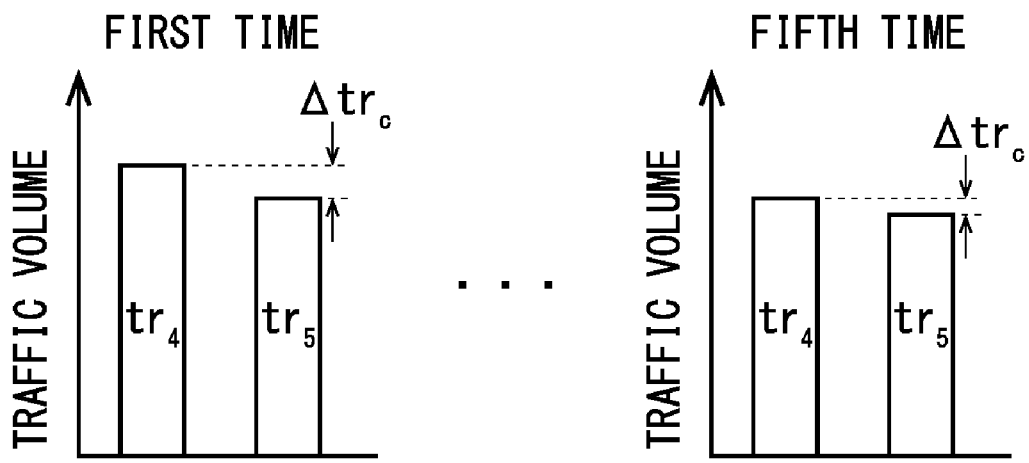
FIG. 11B is a schematic diagram illustrating a monitoring result of the traffic volumes in the third example.

FIG. 11B is a schematic diagram illustrating a monitoring result of the traffic volumes $tr_4$ and $tr_5$.

In this example, the total volumes (bits) of traffic in one minute are set as the traffic volumes $tr_4$ and $tr_5$, and the information processing device 12 calculates a difference $\Delta tr_c$ between them. Then, the information processing device 12 determines the degree of possibility of the redundant configuration based on a ratio $P_c(=\Delta tr_c/tr_4)$ occupied by the difference $\Delta tr_c$ to the traffic volume $tr_4$.

FIG. 12 is a schematic diagram illustrating a determination rule R3 for determining the degree of possibility.

In the determination rule R3, the information processing device 12 determines the degree of possibility depending on which of the conditions "R3-1", "R3-2", and "R3-3" is satisfied, as illustrated in FIG. 12.

Here, the information processing device 12 measures the traffic volumes $tr_4$ and $tr_5$ 5 times. When the ratio $P_c$ is less than 10% in 4 out of 5 times, the condition "R3-1" is satisfied, and the information processing device 12 determines that there is the high possibility of the redundant configuration.

When the ratio $P_c$ is less than 30% in 4 out of 5 times, or the ratio $P_c$ is less than 10% in 2 out of 5 times, the condition "R3-2" is satisfied, and the information processing device 12 determines that there is the medium possibility of the redundant configuration.

In any other cases, the condition "R3-3" is satisfied, and the information processing device 12 determines that there is the low possibility of the redundant configuration.

Fourth Example

FIG. 11A is a schematic diagram illustrating a determination method according to the fourth example. In this example, when the two virtual machines VM1 and VM2 that provide the service A are connected by a network, the information processing device 12 determines a degree of possibility that the virtual machines VM1 and VM2 are redundant databases. The virtual machines VM1 and VM2 may be deployed in the same cloud location, or may be deployed in different cloud locations. Further, the services B, C, and D may be used instead of the service A. This also applies to the fifth example described later.

When the virtual machines VM1 and VM2 are the redundant databases, a content F of a disk D1 in the virtual machine VM1 is copied to a disk D2 in the virtual machine VM2 after a certain period of time $\Delta T$ elapsed. In this case, the virtual machine VM2 operates in the same manner as the virtual machine VM1 after the certain period of time $\Delta T$.

Therefore, a resource usage rate $U_2$ of the virtual machine VM2 should be the same as a resource usage rate $U_1$ of the virtual machine VM1 at the time going back by the certain period of time $\Delta T$.

Therefore, in this example, the information processing device 12 monitors the resource usage rates $U_1$ and $U_2$ to determine the degree of possibility that the virtual machines VM1 and VM2 have the redundant configuration. Examples of such resource usage rates $U_1$ and $U_2$ include a CPU usage rate (%) or a memory usage rate (%) of each of the virtual machines VM1 and VM2.

Figure 13A:
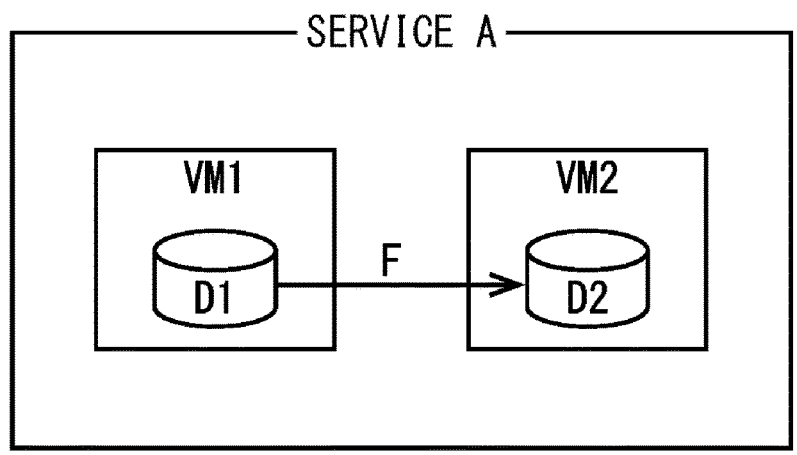
FIG. 13A is a schematic diagram illustrating a determination method according to a fourth example of the present embodiment.
Figure 13B:
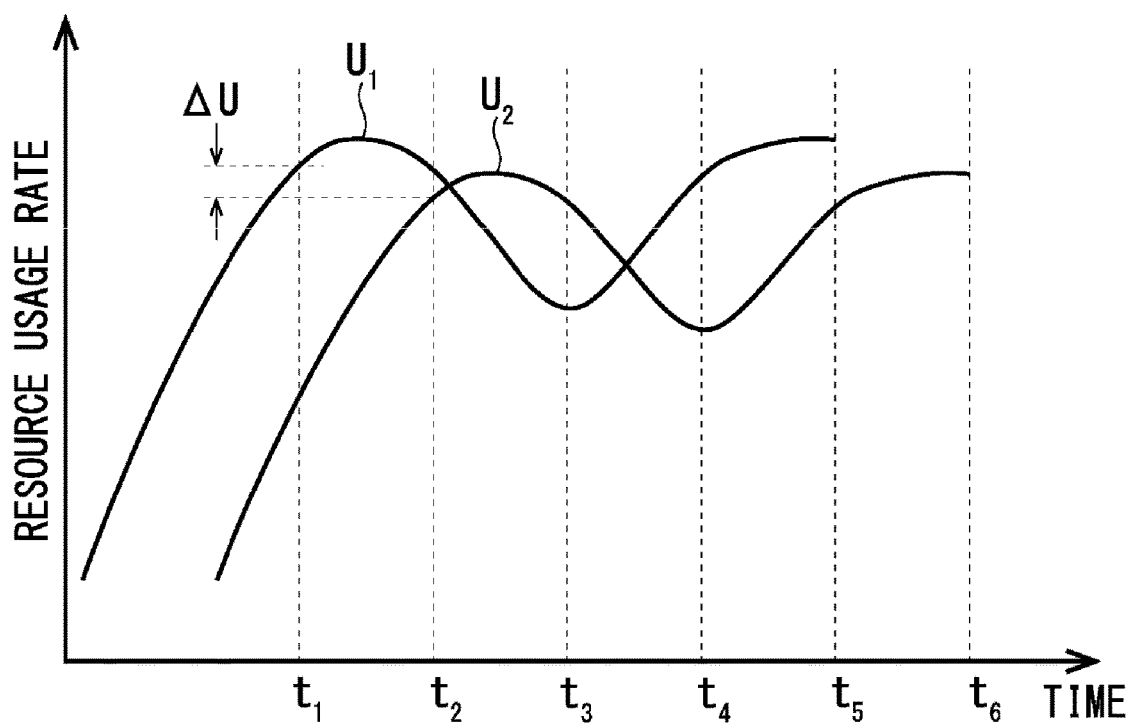
FIG. 13B is a schematic diagram illustrating a monitoring result of resource usage rates in the fourth example.

FIG. 13B is a schematic diagram illustrating a monitoring result of the resource usage rates $U_1$ an $U_2$.

When the virtual machines VM1 and VM2 have the redundant configuration, the graphs of the resource usage rates U1 and U2 have similar shapes as illustrated in FIG. 13B.

In this example, the information processing device 12 calculates a difference $\Delta U$ between a value of the resource usage rate U1 at a time $t_1$ and a value of the resource usage rate U2 at a time $t_2$. Then, the information processing device 12 determines the degree of possibility of the redundant configuration based on a ratio $P_u (=\Delta U/U_1)$ occupied by the difference $\Delta U$ to the resource usage rate $U_1$.

FIG. 14 is a schematic diagram illustrating a determination rule R4 for determining the degree of possibility.

In the determination rule R4, the information processing device 12 determines the degree of possibility depending on which of the conditions "R4-1", "R4-2", and "R4-3" is satisfied, as illustrated in FIG. 14.

In this example, the information processing device 12 measures the difference $\Delta U$ 5 times at different times. In this case, in the n-th measurement, the information processing device 12 measures the difference $\Delta U$ between the resource usage rate $U_1$ at a time $t_n$ and the resource usage rate $U_2$ at a time $t_{n+1}$. A value of "$t_n-t_{n+1}$" is the same for all n, and "$t_n-t_{n+1}$" is expressed as $\Delta T$ ($t_n-t_{n+1}=\Delta T$).

When the ratio $P_u$ is less than 10% in 4 or more out of 5 times, the condition "R4-1" is satisfied, and the information processing device 12 determines that there is the high possibility that the virtual machines VM1 and VM2 have the redundant configuration.

When the ratio $P_u$ is less than 30% in 4 or more out of 5 times, or the ratio $P_u$ is less than 10% in 2 or more out of 5 times, the condition "R4-2" is satisfied, and the information processing device 12 determines that there is the medium possibility of the redundant configuration.

In any other cases, the condition "R4-3" is satisfied, and the information processing device 12 determines that there is the low possibility of the redundant configuration.

Fifth Example

Figure 15A:
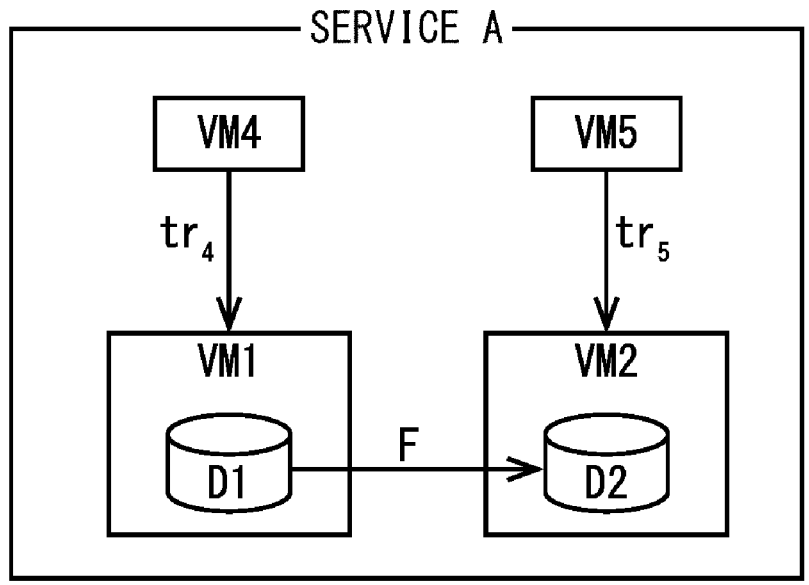
FIG. 15A is a schematic diagram illustrating a determination method according to a fifth example of the present embodiment.

FIG. 15A is a schematic diagram illustrating a determination method according to the fifth example. In FIG. 15A, it is assumed a case where the high possibility that the virtual machines VM1 and VM2 in the service A have the redundant configuration, by the fourth example, is determined. In this case, there is a high possibility that virtual machines VM4 and VM5 in the service A which are connected to the virtual machines VM1 and VM2, respectively, also have the redundant.

In order to confirm this, the information processing device 12 monitors the traffic volume $tr_4$ flowing between the virtual machine VM1 and the virtual machine VM4 and the traffic volume $tr_5$ flowing between the virtual machine VM2 and the virtual machine VM5. If the virtual machines VM4 and VM5 have the redundant configuration, there should be no large difference between the traffic volumes $tr_4$ and $tr_5$.

Therefore, in this example, the information processing device 12 monitors the traffic volumes $tr_4$ and $tr_5$ to determine the degree of possibility that the virtual machines VM4 and VM5 have the redundant configuration.

Figure 15B:
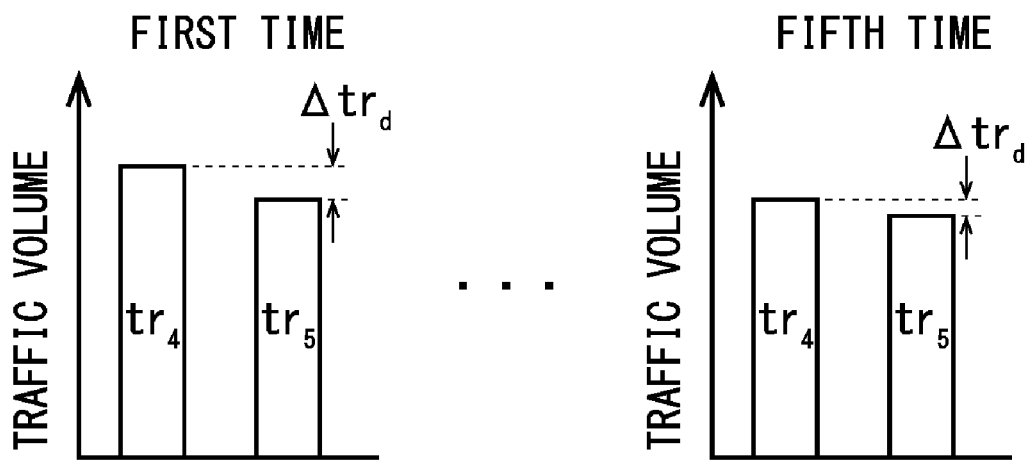
FIG. 15B is a schematic diagram illustrating a monitoring result of the traffic volumes in the fifth example.

FIG. 15B is a schematic diagram illustrating a monitoring result of the traffic volumes $tr_4$ and $tr_5$.

In this example, the total volumes (bits) of traffic in one minute are set as the traffic volumes $tr_4$ and $t_5$, and the information processing device 12 calculates a difference $\Delta tr_d$ between them. Then, the information processing device 12 determines the degree of possibility of the redundant configuration based on a ratio $P_d (=\Delta tr_d/tr_4)$ occupied by the difference $\Delta tr_d$ to the traffic volume $tr_4$.

FIG. 16 is a schematic diagram illustrating a determination rule R5 for determining the degree of possibility.

In the determination rule R5, the information processing device 12 determines the degree of possibility depending on which of the conditions "R5-1", "R5-2", and "R5-3" is satisfied, as illustrated in FIG. 16.

Here, the information processing device 12 measures the traffic volumes $tr_4$ and $tr_5$ 5 times. When the ratio $P_d$ is less than 10% in 4 out of 5 times, the condition "R5-1" is satisfied, and the information processing device 12 determines that there is the high possibility of the redundant configuration.

When the ratio $P_d$ is less than 30% in 4 out of 5 times, or the ratio $P_d$ is less than 10% in 2 out of 5 times, the condition "R5-2" is satisfied, and the information processing device 12 determines that there is the medium possibility of the redundant configuration.

In any other cases, the condition "R5-3" is satisfied, and the information processing device 12 determines that there is the low possibility of the redundant configuration.

Figure 17:
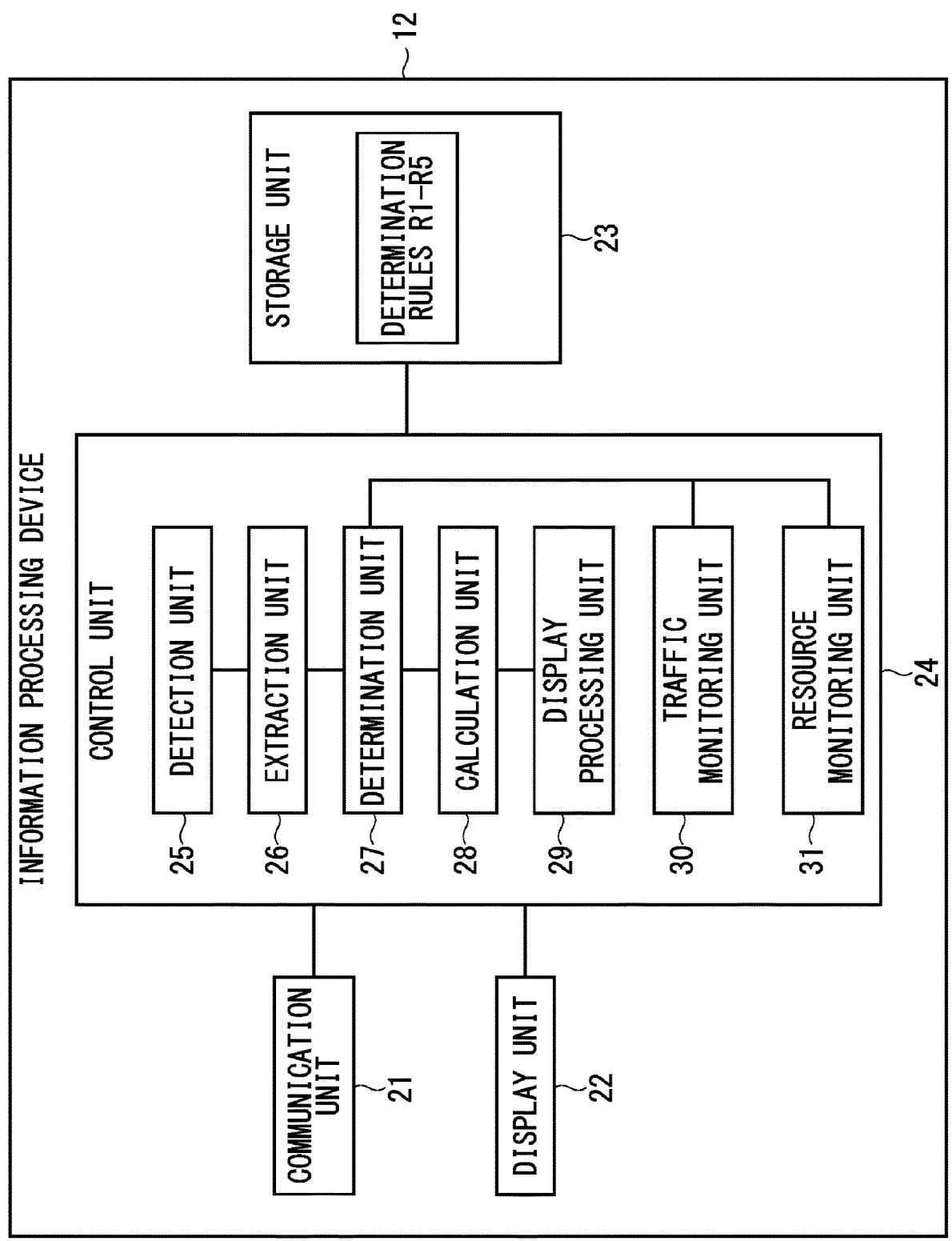
FIG. 17 is a functional configuration diagram of an information processing device according to the present embodiment.

Next, a description is given of the functional configuration of the information processing device 12. FIG. 17 is a functional configuration diagram of the information processing device 12. As illustrated in FIG. 17, the information processing device 12 includes a communication unit 21, a display unit 22, a storage unit 23, and a control unit 24.

The communication unit 21 is a communication interface for connecting its own device to the network 11 (see FIG. 5). The display unit 22 is a processing unit that displays a calculation result of a difference between the usage charges before and after the migration of the virtual machine, and is realized by a liquid crystal display device, for example.

The storage unit 23 is a processing unit realized by, for example, an HDD (Hard Disk Drive), a memory or the like, and stores the above-mentioned determination rules R1 to R5.

The control unit 24 is a processing unit that controls its own device, and includes a detection unit 25, an extraction unit 26, a determination unit 27, a calculation unit 28, a display processing unit 29, a traffic monitoring unit 30 and a resource monitoring unit 31.

The detection unit 25 is a processing unit that detects that the usage charge of each of the virtual machines VM provided by the cloud providers is reduced by periodically referring to the charge information 15 (FIG. 5) of the cloud providers X, Y, and Z.

Further, the detection unit 25 stores virtual machine information related to the virtual machine VM whose usage charge is reduced, in the storage unit 23.

FIG. 18 is a diagram illustrating an example of the virtual machine information. FIG. 18 illustrates a case where the usage charge of each of the virtual machines VM is reduced in the two cloud locations R(=(Z, USA)) and V(=(Z, UK)).

In this case, the detection unit 25 stores the information related to the virtual machines VM of the cloud locations R and V for which the usage charge is reduced, in the virtual machine information. For example, an item "status" indicating that the usage charge is updated stores "update". An item "cloud provider" stores the cloud provider "Z" that reduced the usage charge. An item "type" stores "nano" which is a type of the virtual machine VM provided by the cloud provider "Z". An item "region" stores the regions "USA" and "UK" where the virtual machines VM whose usage charges are reduced are deployed. An item "number of CPU" stores the number of virtual CPUs in the virtual machine whose usage charge is reduced.

An item "usage charge" stores the usage charge of the virtual machine VM after the charge reduction. Furthermore, an item "OS" stores a name of an OS to be run by the virtual machine VM after the charge reduction.

Referring to FIG. 17 again, the extraction unit 26 extracts a plurality of virtual machines VM having attributes similar to those of the plurality of virtual machines whose usage charges are reduced detected by the detection unit 25, from all the virtual machines VM that provide the service A. One of the attributes is the number of virtual CPUs that the virtual machine VM includes. When the number of virtual CPUs in the two virtual machines are the same as each other, it is determined that the attributes of the virtual machines are similar to each other. A capacity of a virtual memory in the virtual machine VM may be adopted as the attribute. In addition, the extraction unit 26 extracts the virtual machines VM for the services B, C, and D in the same way.

The determination unit 27 is a processing unit that determines the degree of possibility that the virtual machine VM having the redundant configuration exists in the plurality of virtual machines VM that provide the services. As an example, the determination unit 27 determines the degree of possibility that each of the plurality of virtual machine VMs extracted by the extraction unit 26 has the redundant configuration, according to any of the above-mentioned determination rules R1 to R5. At the time of the determination, the determination unit 27 uses a monitoring result of either the traffic monitoring unit 30 or the resource monitoring unit 31 described later.

For example, it is assumed that the virtual machines extracted by the extraction unit 26 are the virtual machines VM1 and VM2 in the service A. In this case, the determination unit 27 identifies the virtual machine VM3 connected to each of the virtual machines VM1 and VM2 as illustrated in FIG. 7A. Then, the determination unit 27 determines the degree of possibility that the virtual machines VM1 and VM2 have the redundant configuration, based on the traffic volumes $tr_1$ and $tr_2$ and the determination rule R1 (FIG. 8). This determination is executed by the determination unit 27 for each of the services A, B, C, and D.

The calculation unit 28 is a processing unit that calculates a difference between the usage charges before and after the migration when a first virtual machine among the plurality of virtual machines is migrated to another cloud location different from the cloud location where the first virtual machine is deployed.

Figure 19:
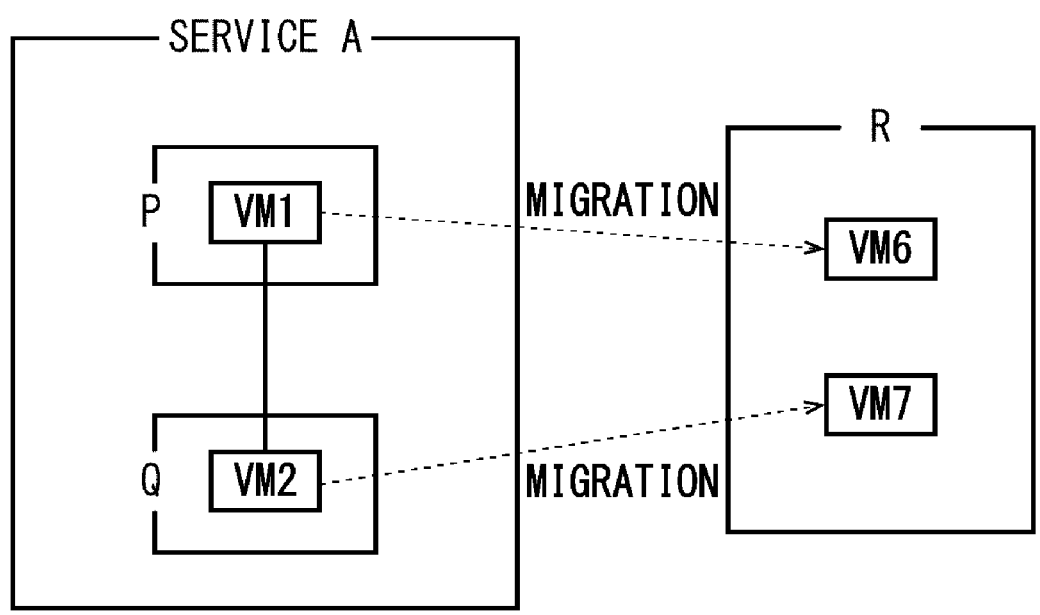
FIG. 19 is a schematic diagram illustrating an example of deployment destinations of the virtual machines to be calculated in the present embodiment.

FIG. 19 is a schematic diagram illustrating an example of deployment destinations of the virtual machines to be calculated.

Hereinafter, a description is given of a case of calculating the usage charges before and after the migration of the virtual machine VM for providing the service A as an example. In this case, it is assumed that the virtual machines extracted by the extraction unit 26 are the virtual machine VM1 in the cloud location P and the virtual machine VM2 in the cloud location Q. Further, it is assumed that the virtual machines whose usage charges are reduced are virtual machines VM6 and VM7 in the cloud location R. In this case, the calculation unit 28 calculates the usage charge of the service A when the virtual machine VM1 is migrated to the virtual machine VM6 and the virtual machine VM2 is migrated to the virtual machine VM7, and calculates a difference between calculated usage charge and the usage charge before the migration. This calculation is executed by the calculation unit 28 for each of the services A, B, C, and D.

Referring to FIG. 17 again, the display processing unit 29 is a processing unit that executes a process of displaying the calculation result by the calculation unit 28 and the determination result by the determination unit 27 on the display unit 22.

The traffic monitoring unit 30 is a processing unit that monitors each of the traffic volumes $tr_1$, $tr_2$, $tr_3$, $tr_4$ and $tr_5$ in FIGS. 7A, 9A, 11A and 15A. The resource monitoring unit 31 is a processing unit that monitors the resource usage rates $U_1$ and $U_2$ in FIG. 13B.

Figure 20:
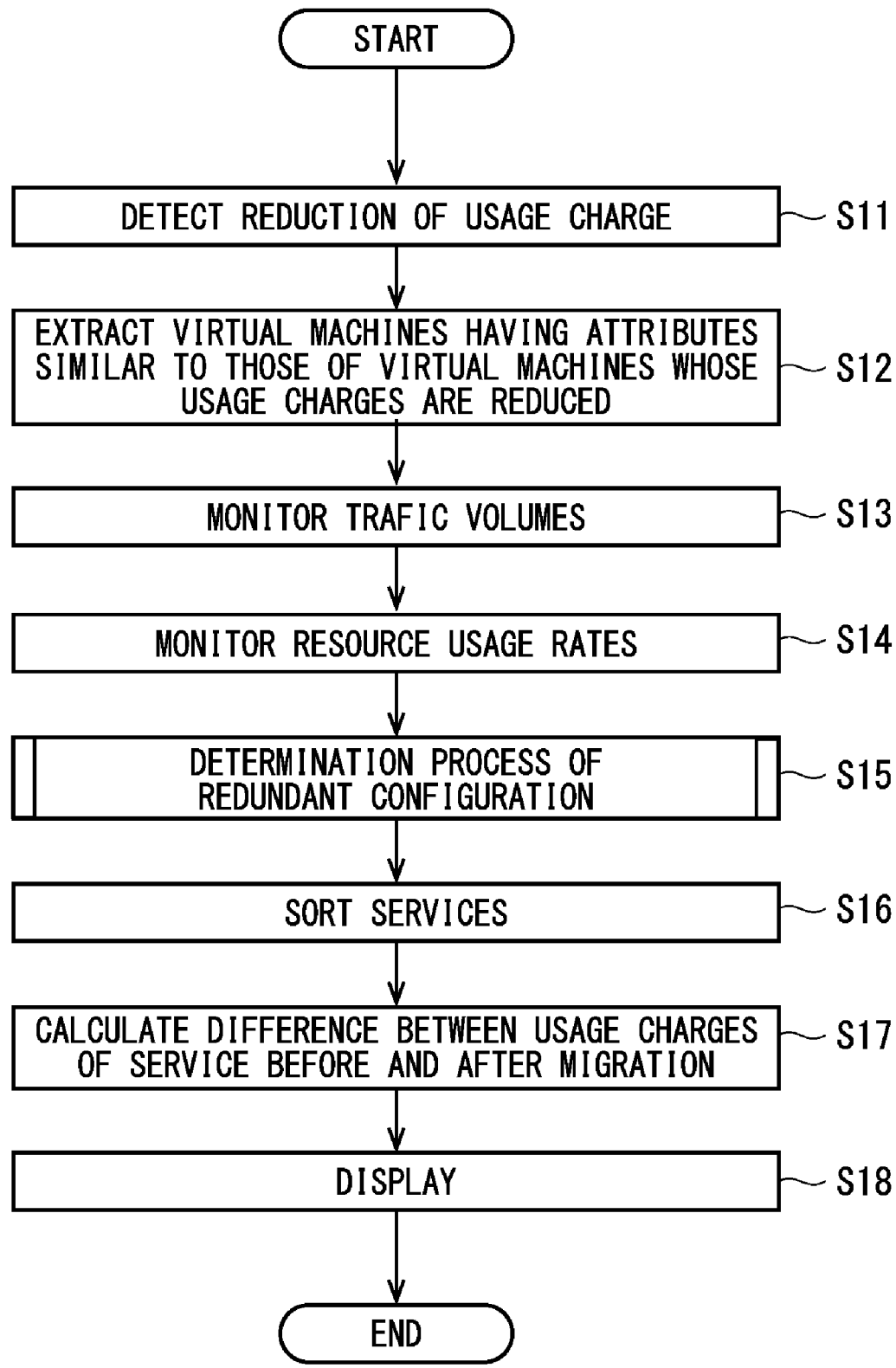
FIG. 20 is a flowchart of a charge calculation method according to the present embodiment.

Next, a description is given of a charge calculation method according to the present embodiment. FIG. 20 is a flowchart of the charge calculation method according to the present embodiment. First, the detection unit 25 detects that the usage charge of the virtual machine provided by any of the cloud providers X, Y, and Z is reduced by referring to the charge information 15 (step S11). Then, the detection unit 25 stores the virtual machine information (see FIG. 18) related to the virtual machine whose usage charge is reduced, in the storage unit 23.

Next, the extraction unit 26 extracts the plurality of virtual machines VM having attributes similar to those of the virtual machines whose usage charges are reduced detected in step S11, from all the virtual machines VM that provide the service A (step S12).

For example, it is assumed that the virtual machines in which the reduction of the usage charge detected are the virtual machines VM6 and VM7 in the cloud location R (see FIG. 19). In this case, the extraction unit 26 extracts the plurality of virtual machines VM each having the same number of virtual CPUs as any of the virtual machines VM6 and VM7 from all the virtual machine VMs that provide the service A. The capacity of the virtual memory may be used instead of the number of virtual CPUs. Further, the extraction unit 26 extracts the plurality of virtual machines VM for the services B, C, and D in the same way.

Next, the traffic monitoring unit 30 monitors the traffic volumes tr1, tr2, tr3, tr4 and tr5 (see FIGS. 7A, 9A, 11A and 15A) of the respective extracted virtual machines VM (step S13).

Further, the resource monitoring unit 31 monitors the resource usage rates $U_1$ and $U_2$ (see FIG. 13B) of the respective extracted virtual machines VM (step S14).

Next, the determination unit 27 performs a determination process for determining the degree of possibility that the virtual machine having the redundant configuration exist in the plurality of virtual machines providing the service (step S15). Here, the determination unit 27 determines the degree of possibility that the respective extracted virtual machines VM have the redundant configuration based on any of the above-mentioned determination rules R1 to R5. The details of the determination process are described later.

Next, the calculation unit 28 sorts the plurality of services A, B, C, and D (step S16).

Figure 21:
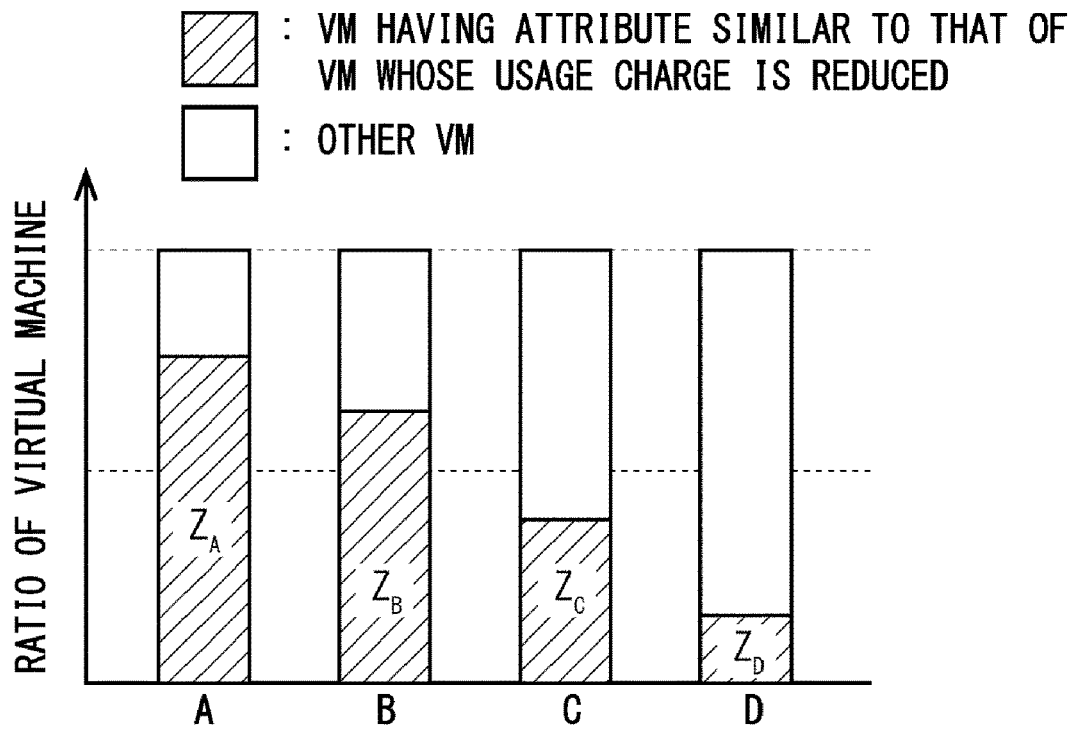
FIG. 21 is a schematic diagram illustrating a sorting method in the present embodiment.
Figure 21:
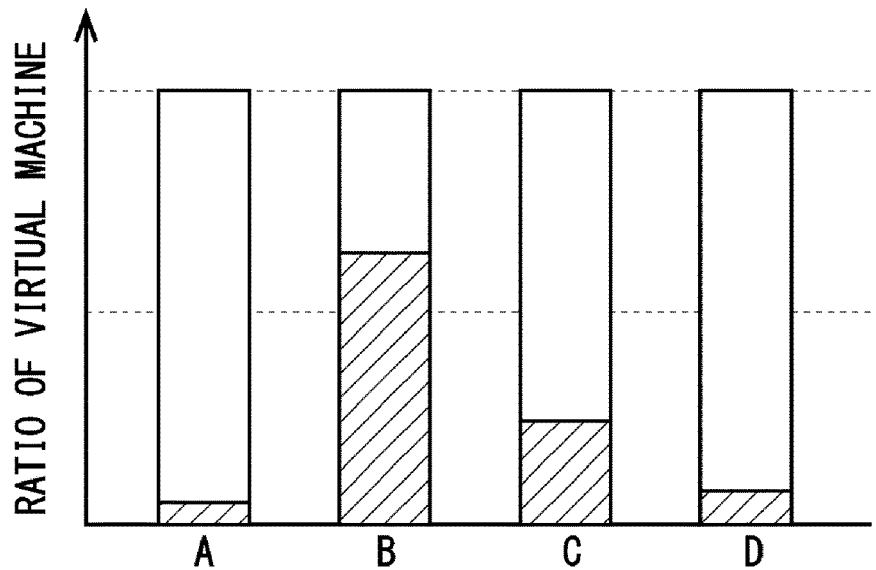

FIG. 21 is a schematic diagram illustrating a sorting method. A ratio $Z_A$ in FIG. 21 indicates a ratio of the number of virtual machines having attributes similar to those of the virtual machines whose usage charges are reduced, to the number of all virtual machines VM included in the service A. The same applies to the respective ratios $Z_B$, $Z_C$, and $Z_D$ of other services B, C, and D.

Before sorting, the service A has the highest ratio occupied by the virtual machine whose usage charge is reduced.

In this embodiment, each of the ratios $Z_A$, $Z_B$, $Z_C$, and $Z_D$ is multiplied by a coefficient α corresponding to the degree of possibility that the plurality of virtual machines VM having similar attributes to the virtual machine whose usage charge is reduced have the redundant configuration. The coefficient α is a coefficient that decreases as the degree of possibility of the redundant configuration increases. Here, the coefficient α is set to 0.1 (α=0.1) when the possibility of the redundant configuration is high, and the coefficient α is set to 0.5 (α=0.5) when the possibility of the redundant configuration is medium. Moreover, the coefficient α is set to 1 (α=1) when the possibility of the redundant configuration is low.

Here, it is assumed that the service A has a high possibility of including the virtual machine VM having the redundant configuration and the coefficient α is set to 0.1 (α=0.1). It is assumed that each of the services C and D has a medium possibility of including the virtual machine VM having the redundant configuration and the coefficient α is set to 0.5 (α=0.5). Further, it is assumed that each of the services C and D has a low possibility of including the virtual machine VM having the redundant configuration and the coefficient α is set to 1 (α=1).

Figure 22A:
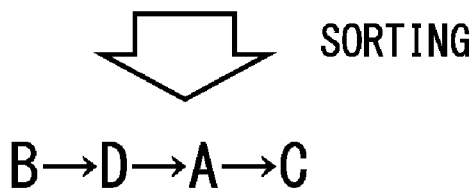
FIG. 22A is a schematic diagram illustrating another sorting method in the present embodiment.

The calculation unit 28 multiplies each of the ratios ZA, ZB, ZC, and ZD by the coefficient α, and sorts the respective services in a descending order of the multiplication results. In this example, the service B has the largest multiplication result, and the services C, D, and A have smaller multiplication results in that order. The sorting method is not limited to this. FIG. 22A is a schematic diagram illustrating another sorting method.

In this example, the services A, B, C, and D are sorted in an ascending order of the degree of possibility of the redundant configuration determined in step S15. For example, it is assumed that the possibility of redundant configuration is high in the services A and C, medium in the service D, and low in the service B, as illustrated in FIG. 22A.

In this case, when the calculation unit 28 sorts the services, the services B, D, A and C are arranged in this order (B→D→A→C).

Figure 22B:
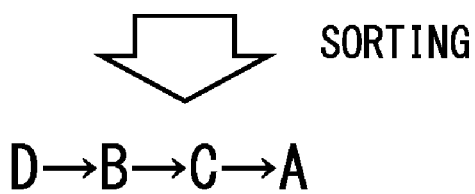
FIG. 22B is a schematic diagram illustrating still another sorting method in the present embodiment.

FIG. 22B is a schematic diagram illustrating still another sorting method. In this example, the services A, B, C, and D are sorted in the descending order of the total number of resources included in the respective virtual machines VM extracted in step S12. The total number of resources that serve as a basis for sorting is the total number of virtual CPUs in all the extracted virtual machines VM. Further, a total capacity of the virtual memories in all the extracted virtual machines VM may be adopted as the total number of resources.

In case of FIG. 22B, when the calculation unit 28 sorts the services, the services D, B, C and A are arranged in this order (D→B→C→A).

Referring to FIG. 20 again, the calculation unit 28 calculates the difference between the usage charges of the service before and after the migration of the virtual machine with reference to the charge information 15 (step S17). Here, the calculation unit 28 calculates the difference between the usage charges of the service before and after the migration, based on the charge information 15, when the respective virtual machines VM extracted in step S12 are migrated to the virtual machines VM after the charge reduction.

At this time, the calculation unit 28 calculates the difference between the usage charges in order from the beginning of the services sorted as illustrated in FIG. 21. In the example of FIG. 21, a calculation order of the difference between the usage charges is an order of the service B, the service C, the service D and the service A.

The calculation process of step S17 terminates without calculating the difference between the usage charges for subsequent services when a difference between the calculated usage charge and the current usage charge is not equal to or less than a predetermined charge. For example, the calculation unit 28 terminates the calculation when it is determined that a migration cost required to migrate the respective virtual machines VM to the virtual machines whose usage charges are reduced is larger than the difference. This avoids a situation where the charge reduction for the respective virtual machines VM is offset by the migration cost, resulting in a higher charge for the service.

In the present embodiment, as a result of the sorting as illustrated in FIG. 21, the calculation is performed in order from the service that includes many virtual machines VM having attributes similar to those of the virtual machines whose usage charges are reduced, and has a low possibility that the many virtual machines VM have the redundant configuration. Therefore, the usage charge can be greatly reduced by migrating the virtual machines VM. Further, since the many virtual machines VM do not have the redundant configuration, it is possible to preferentially calculate the service that the user of the service can easily accept the migration.

On the other hand, with respect to the service where there are few virtual machines VM having attributes similar to those of the virtual machines whose usage charges are reduced and the charge reduction cannot be expected so much, the calculation is likely to be terminated, and unnecessary calculation can be avoided. Similarly, with respect to the service where there is a high possibility that the respective virtual machines VM have the redundant configuration and it is expected that the user of the service hardly accepts the migration of the virtual machines VM, the calculation is terminated and the unnecessary calculation can be avoided.

Similarly, also when the sorting is performed based on the degree of possibility of the redundant configuration as illustrated in FIG. 22A, the calculation for the service having a high possibility of the redundant configuration is likely to be terminated, and the unnecessary calculation can be avoided.

When the sorting is performed based on the total number of resources as illustrated in FIG. 22B, the calculation is performed in order from the service provided by the virtual machines having a large total number of resources and a high usage charge. Therefore, the calculation is performed in order from the service with the large charge reduction due to the migration of the virtual machines, and the unnecessary calculation for the service with the small charge reduction that is difficult for the user to accept can be terminated.

Then, the display processing unit 29 performs a process of displaying the degree of possibility that the virtual machine having the redundant configuration determined in step S15 exists and the calculation result of the difference between the usage charges in step S17 on the display unit 22 (step S18). This completes basic steps in the charge calculation method according to the present embodiment.

FIG. 23 is a schematic diagram illustrating an example of screen display of the display unit 22 in step S18.

In this example, the display processing unit 29 causes the display unit 22 to display a rate of the charge reduction from the usage charge before the migration in an identifiable manner, as the difference between the usage charges of the service before and after the migration of the virtual machines. The display processing unit 29 may display the usage charge after the charge reduction on the display unit 22 instead of the difference between the usage charges.

The display processing unit 29 causes characters "high", "medium" and "low" to be displayed on the display unit 22 in the identifiable manner as the degree of the possibility that the virtual machines having the redundant configuration exist in the current respective virtual machines VM.

Thereby, the administrator N of the services A, B, C, and D can confirm the degree of possibility that the virtual machines VM having the redundant configuration exist in each service, and the difference between the usage charges. As a result, the administrator N can predict whether the user of the service accepts the migration to another virtual machine whose usage charge is reduced, and then determine whether to present the usage charge after the charge reduction to the user.

For example, the service A has a maximum charge reduction rate compared to other services, but on the other hand, there is a high possibility that the current virtual machine VM having the attribute similar to that of other virtual machine whose usage charge is reduced has the redundant configuration. If the virtual machine VM is migrated to the other virtual machine whose usage charge is reduced in the same cloud location, the virtual machines VM having the redundant configuration are deployed in the same cloud location. In this case, each virtual machine VM cannot be used when the failure occurs in the above-mentioned cloud location, and hence there is no sense in making each virtual machine VM redundant. Therefore, the administrator N can predict that the user of the service A prevents the migration of the virtual machine, and can refrain from proposing the migration of the virtual machine to the user of service A.

Moreover, since it is possible to prevent the administrator N from accidentally migrating the virtual machine VM having the redundant configuration to the same cloud location, it is also possible to obtain a technical improvement that the availability of service A can be prevented from decreasing.

On the contrary, the service B has a small price reduction rate, but there is a low possibility that the virtual machine VM having the attribute similar to that of the virtual machine whose usage charge is reduced has the redundant configuration. Therefore, even if the virtual machine VM is migrated to the same cloud location where the usage charge is reduced, it is unlikely that the user of the service B is concerned about the redundant configuration of the virtual machine VM to prevent the migration. As a result, the administrator N can positively propose to the user of the service B to migrate the virtual machine.

Next, a description is given of the determination process in step S15. This determination process can be performed by any one of the following first to fifth examples.

First Example

Figure 24:
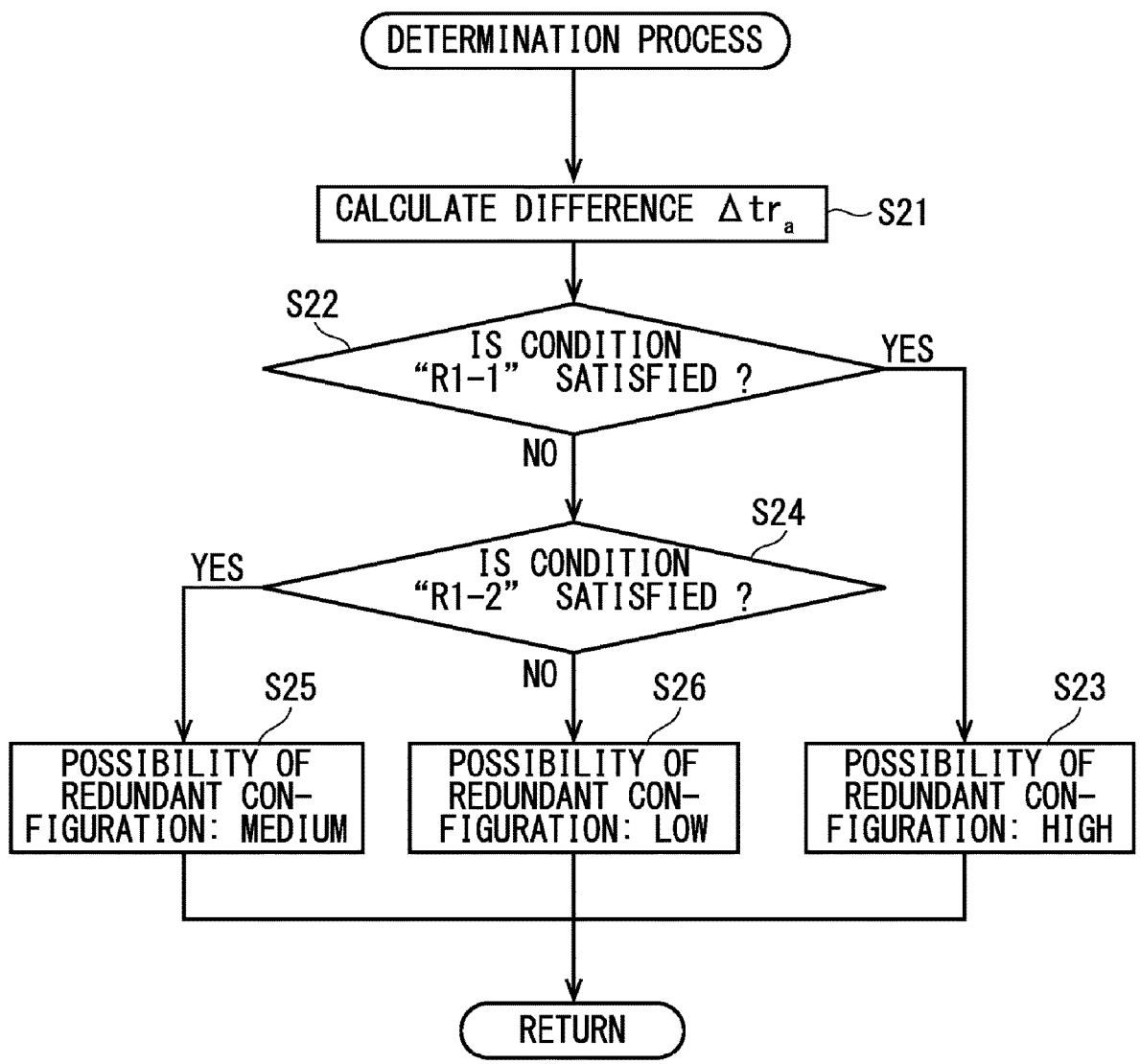
FIG. 24 is a flowchart of a determination process according to the first example of the present embodiment.

FIG. 24 is a flowchart of the determination process according to the first example. In this example, the degree of possibility of the redundant configuration is determined by using the traffic volumes $tr_1$ and $tr_2$ illustrated in FIGS. 7A and 7B.

First, the determination unit 27 calculates the difference $\Delta tr_a$ between the traffic volumes $tr_1$ and $tr_2$ monitored by the traffic monitoring unit 30 (step S21), and further calculates the ratio $P_t(=\Delta tr_a/tr_1)$.

Next, the determination unit 27 determines whether the ratio $P_t$ satisfies the condition "R1-1" of the determination rule R1 (see FIG. 8) (step S22). When the ratio $P_t$ satisfies the condition "R1-1" (step S22: YES), the process proceeds to step S23, and the determination unit 27 determines that the degree of possibility of the redundant configuration is "high".

When the ratio $P_t$ does not satisfy the condition "R1-1" (step S22: NO), the process proceeds to step S24. The determination unit 27 determines whether the ratio $P_t$ satisfies the condition "R1-2" of the determination rule R1 (step S24). When the ratio $P_t$ satisfies the condition "R1-2" (step S24: YES), the process proceeds to step S25, and the determination unit 27 determines that the degree of possibility of the redundant configuration is "medium".

When the ratio $P_t$ does not satisfy the condition "R1-2" (step S24: NO), the process proceeds to step S26. In step S26, the determination unit 27 determines that the degree of possibility of the redundant configuration is "low". After this, the process returns to S16 of FIG. 20.

Second Example

Figure 25:
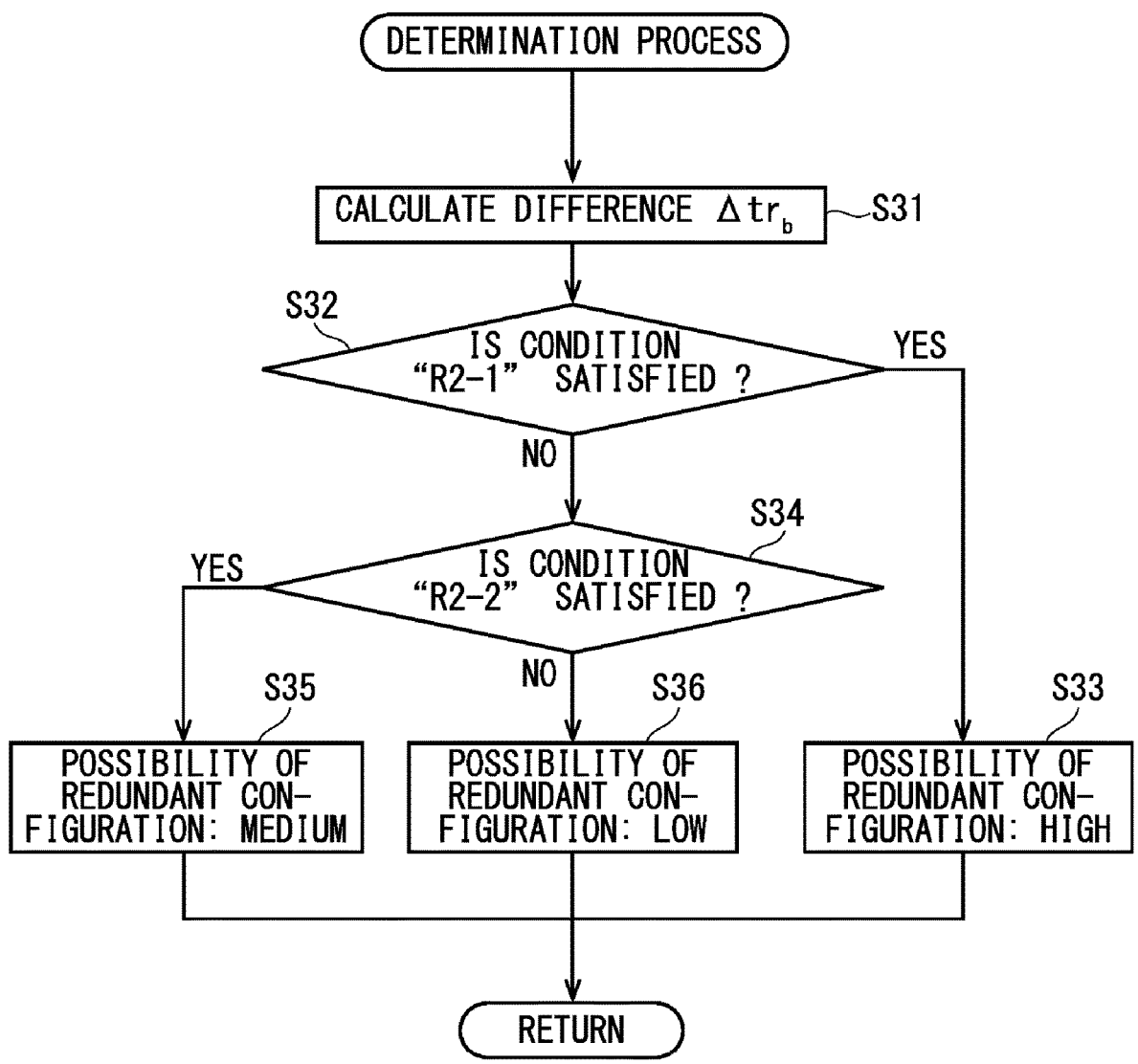
FIG. 25 is a flowchart of a determination process according to the second example of the present embodiment.

FIG. 25 is a flowchart of the determination process according to the second example. In this example, the degree of possibility of the redundant configuration is determined by using the traffic volumes $tr_1$, $tr_2$ and $tr_3$ illustrated in FIGS. 9A and 9B.

First, the determination unit 27 calculates the difference $\Delta tr_b$ between the total value $tr_{tot}$ of the output traffic volumes $tr_1$ and $tr_2$ and the input traffic amount $tr_3$ which are monitored by the traffic monitoring unit 30 (step S31), and further calculates the ratio $P_b(=\Delta tr_b/tr_3)$.

Next, the determination unit 27 determines whether the ratio $P_b$ satisfies the condition "R2-1" of the determination rule R2 (see FIG. 10) (step S32). When the ratio $P_b$ satisfies the condition "R2-1" (step S32: YES), the process proceeds to step S33, and the determination unit 27 determines that the degree of possibility of the redundant configuration is "high".

When the ratio $P_b$ does not satisfy the condition "R2-1" (step S32: NO), the process proceeds to step S34. The determination unit 27 determines whether the ratio $P_b$ satisfies the condition "R2-2" of the determination rule R2 (step S34). When the ratio $P_b$ satisfies the condition "R2-2" (step S34: YES), the process proceeds to step S35, and the determination unit 27 determines that the degree of possibility of the redundant configuration is "medium".

When the ratio $P_b$ does not satisfy the condition "R2-2" (step S34: NO), the process proceeds to step S36. In step S36, the determination unit 27 determines that the degree of possibility of the redundant configuration is "low". After this, the process returns to S16 of FIG. 20.

Third Example

Figure 26:
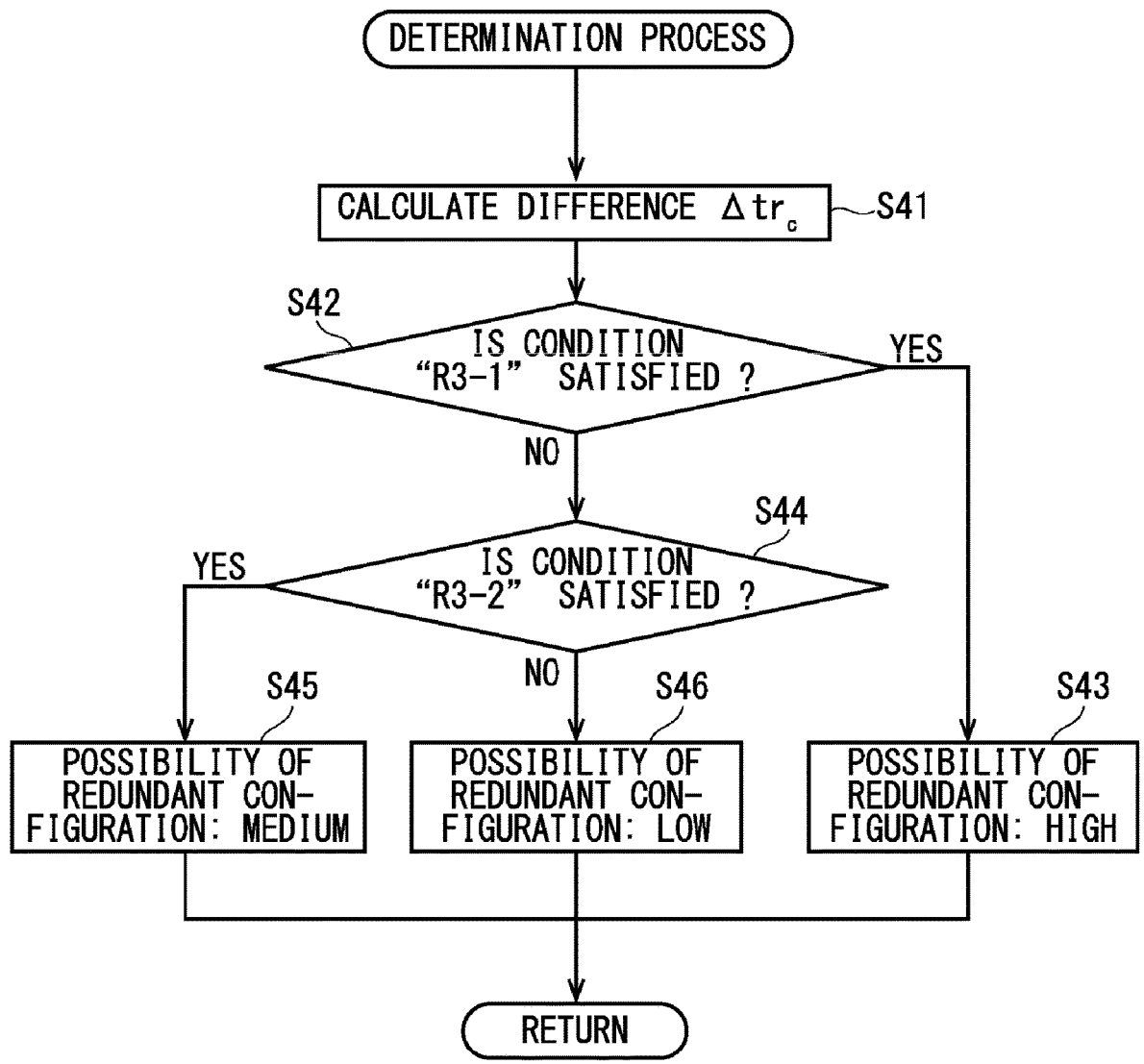
FIG. 26 is a flowchart of a determination process according to the third example of the present embodiment.

FIG. 26 is a flowchart of the determination process according to the third example. In this example, the degree of possibility of the redundant configuration is determined by using the traffic volumes $tr_4$ and $tr_5$ illustrated in FIGS. 11A and 11B.

First, the determination unit 27 calculates the difference $\Delta tr_c$ between the traffic volumes $tr_4$ and $tr_5$ monitored by the traffic monitoring unit 30 (step S41), and further calculates the ratio $P_c(=\Delta tr_c/tr_4)$.

Next, the determination unit 27 determines whether the ratio $P_c$ satisfies the condition "R3-1" of the determination rule R3 (see FIG. 12) (step S42). When the ratio $P_c$ satisfies the condition "R3-1" (step S42: YES), the process proceeds to step S43, and the determination unit 27 determines that the degree of possibility of the redundant configuration is "high".

When the ratio $P_c$ does not satisfy the condition "R3-1" (step S42: NO), the process proceeds to step S44. The determination unit 27 determines whether the ratio $P_c$ satisfies the condition "R3-2" of the determination rule R3 (step S44). When the ratio $P_c$ satisfies the condition "R3-2" (step S24: YES), the process proceeds to step S45, and the determination unit 27 determines that the degree of possibility of the redundant configuration is "medium".

When the ratio $P_c$ does not satisfy the condition "R3-2" (step S44: NO), the process proceeds to step S46. In step S46, the determination unit 27 determines that the degree of possibility of the redundant configuration is "low". After this, the process returns to S16 of FIG. 20.

Fourth Example

Figure 27:
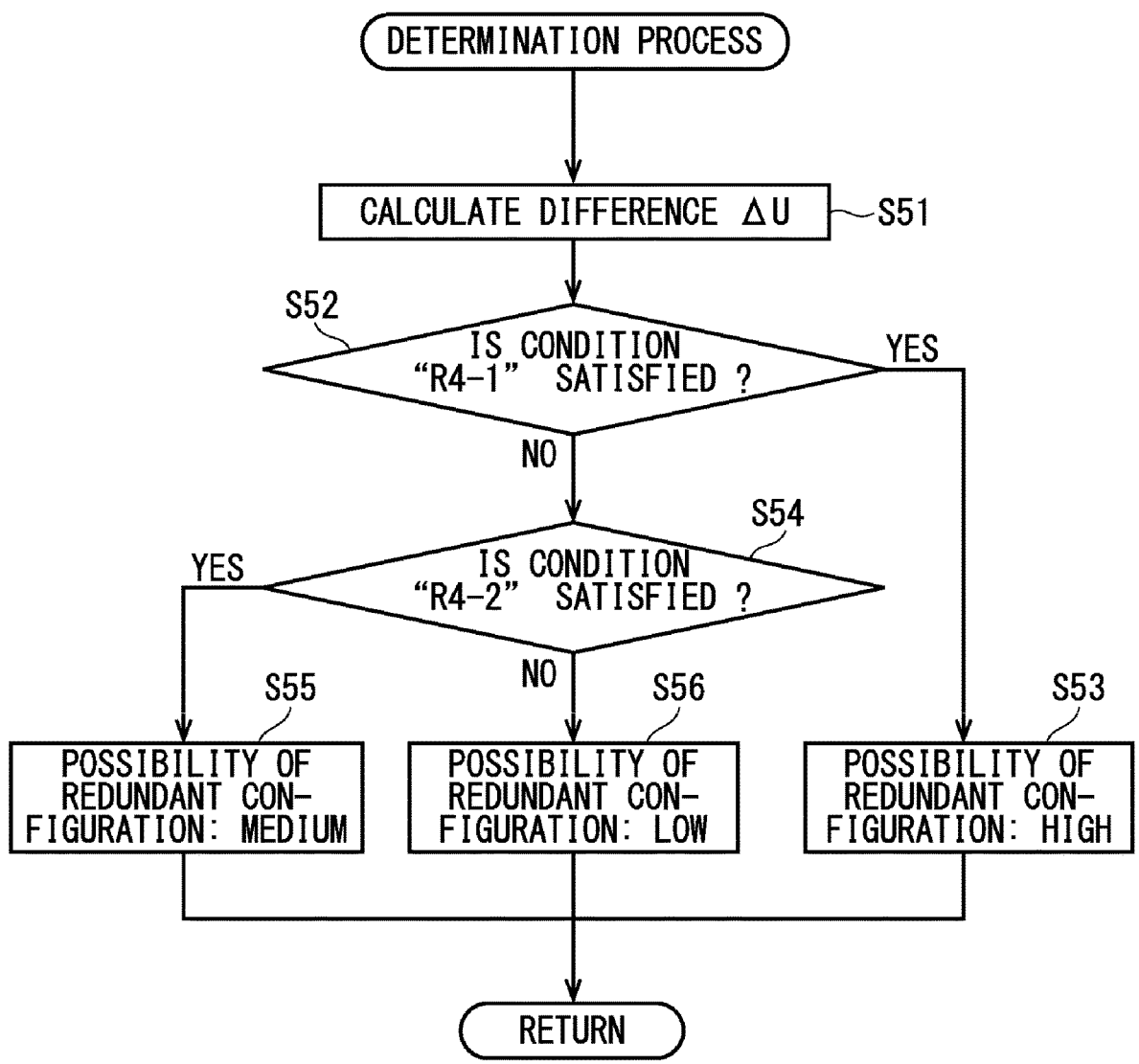
FIG. 27 is a flowchart of a determination process according to the fourth example of the present embodiment.

FIG. 27 is a flowchart of the determination process according to the fourth example. In this example, the degree of possibility of the redundant configuration is determined by using the resource usage rates $U_1$ and $U_2$ illustrated in FIG. 13B.

First, the determination unit 27 calculates the difference $\Delta U$ between the resource usage rate $U_1$ and the resource usage rate $U_2$ monitored by the resource monitoring unit 31 (step S51), and further calculates the ratio $Pu(=\Delta U/U_1)$. In the difference $\Delta U$, the resource usage rate $U_1$ is a value at the time $t_1$, and the resource usage rate $U_2$ is a value at the time $t_2$.

Next, the determination unit 27 determines whether the ratio $P_u$ satisfies the condition "R4-1" of the determination rule R4 (see FIG. 14) (step S52). When the ratio $P_u$ satisfies the condition "R4-1" (step S52: YES), the process proceeds to step S53, and the determination unit 27 determines that the degree of possibility of the redundant configuration is "high".

When the ratio $P_u$ does not satisfy the condition "R4-1" (step S52: NO), the process proceeds to step S54. The determination unit 27 determines whether the ratio $P_u$ satisfies the condition "R4-2" of the determination rule R4 (step S54). When the ratio $P_u$ satisfies the condition "R4-2" (step S54: YES), the process proceeds to step S55, and the determination unit 27 determines that the degree of possibility of the redundant configuration is "medium".

When the ratio $P_u$ does not satisfy the condition "R4-2" (step S54: NO), the process proceeds to step S56. In step S56, the determination unit 27 determines that the degree of possibility of the redundant configuration is "low". After this, the process returns to S16 of FIG. 20.

Fifth Example

Figure 28:
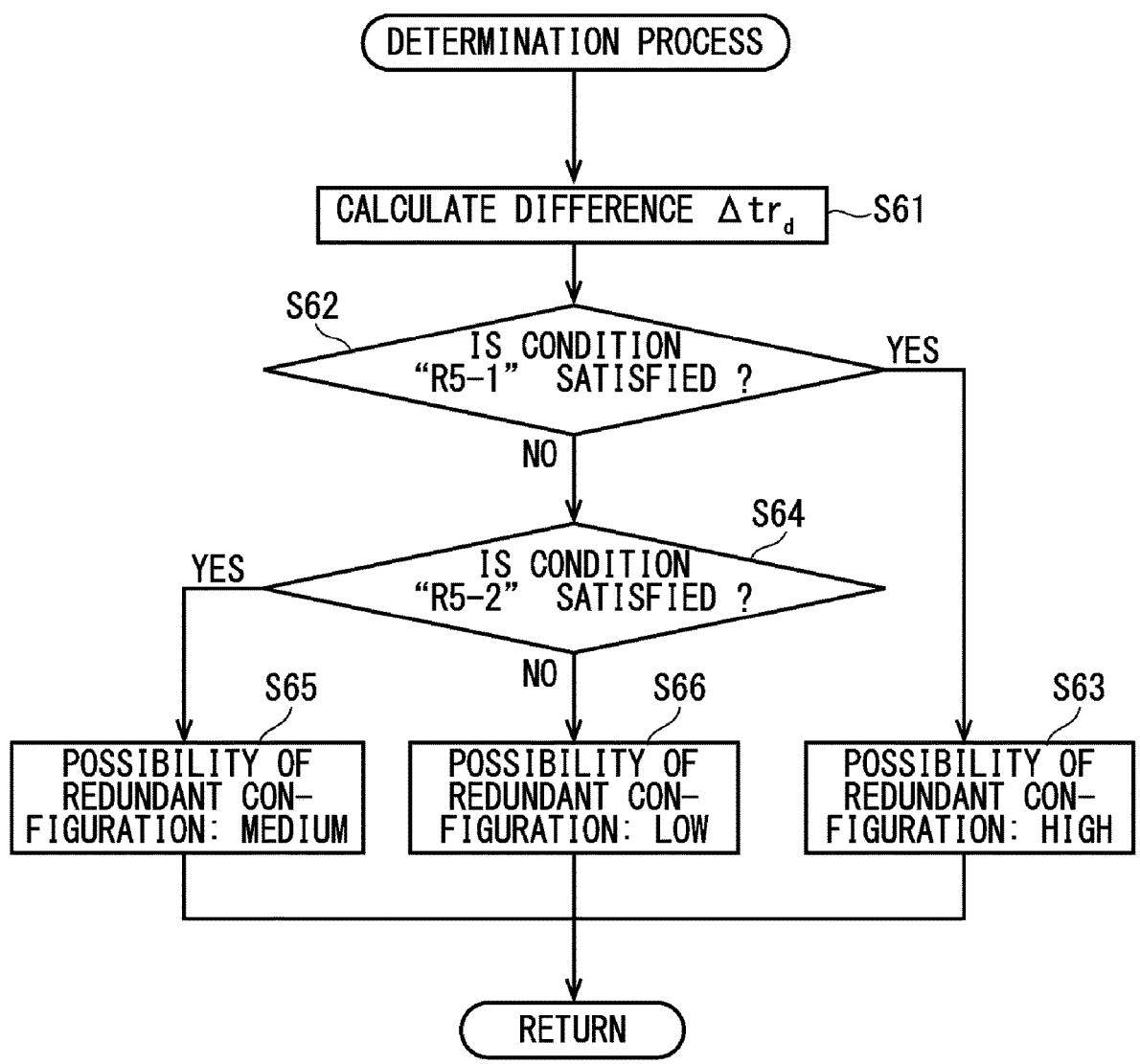
FIG. 28 is a flowchart of a determination process according to the fifth example of the present embodiment.

FIG. 28 is a flowchart of the determination process according to the fifth example. In this example, the degree of possibility of the redundant configuration is determined by using the traffic volumes $tr_4$ and $tr_5$ illustrated in FIGS. 15A and 15B.

First, the determination unit 27 calculates the difference $\Delta tr_d$ between the traffic volumes $tr_4$ and $tr_5$ monitored by the traffic monitoring unit 30 (step S61), and further calculates the ratio $P_d(=\Delta tr_d/tr_4)$.

Next, the determination unit 27 determines whether the ratio $P_d$ satisfies the condition "R5-1" of the determination rule R5 (see FIG. 16) (step S62). When the ratio $P_d$ satisfies the condition "R5-1" (step S62: YES), the process proceeds to step S63, and the determination unit 27 determines that the degree of possibility of the redundant configuration is "high".

When the ratio $P_d$ does not satisfy the condition "R5-1" (step S62: NO), the process proceeds to step S64. The determination unit 27 determines whether the ratio $P_d$ satisfies the condition "R5-2" of the determination rule R5 (step S64). When the ratio $P_d$ satisfies the condition "R5-2" (step S64: YES), the process proceeds to step S65, and the determination unit 27 determines that the degree of possibility of the redundant configuration is "medium".

When the ratio $P_d$ does not satisfy the condition "R5-2" (step S64: NO), the process proceeds to step S66. In step S66, the determination unit 27 determines that the degree of possibility of the redundant configuration is "low". After this, the process returns to S16 of FIG. 20.

Hardware Configuration

Next, a description is given of hardware configuration of the information processing device 12 according to the present embodiment.

Figure 29:
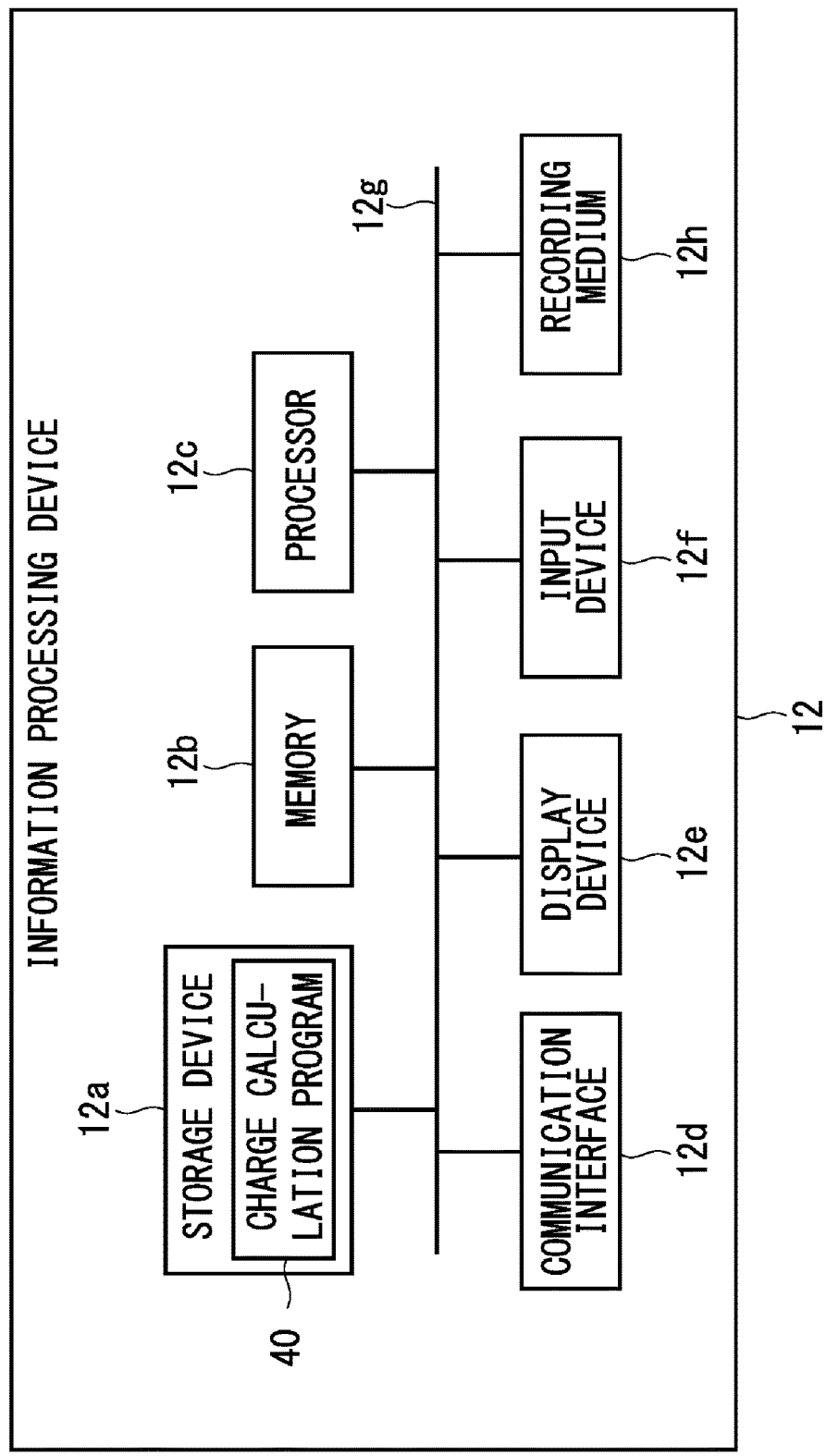
FIG. 29 is a hardware configuration diagram of the information processing device according to the present embodiment.

FIG. 29 is a hardware configuration diagram of the information processing device 12 according to the present embodiment.

As illustrated in FIG. 29, the information processing device 12 includes a storage device 12a, a memory 12b, a processor 12c, a communication interface 12d, a display device 12e, and an input device 12f. These elements are connected to each other by a bus 12g.

The storage device 12a is a non-volatile storage such as an HDD (Hard Disk Drive) or an SSD (Solid State Drive), and stores a charge calculation program 40 according to the present embodiment.

The charge calculation program 40 may be recorded on a computer-readable recording medium 12h, and the processor 12c may read the charge calculation program 40 from the recording medium 12h.

Examples of such a recording medium 12h include physically portable recording media such as a CD-ROM (Compact Disc-Read Only Memory), a DVD (Digital Versatile Disc), and a USB (Universal Serial Bus) memory. Further, a semiconductor memory such as a flash memory, or a hard disk drive may be used as the recording medium 12h. The recording medium 12h is not a temporary medium such as a carrier wave having no physical form.

Further, the charge calculation program 40 may be stored in a device connected to a public line, an Internet, a LAN (Local Area Network), or the like. In this case, the processor 12c may read and execute the charge calculation program 40.

Meanwhile, the memory 12b is hardware that temporarily stores data, such as a DRAM, and the charge calculation program 40 is deployed on the memory 12b.

The processor 12c is hardware such as a CPU (Central Processing Unit) and a GPU (Graphical Processing Unit)

that control each part of the information processing device 12. Further, the processor 12c executes the charge calculation program 40 in cooperation with the memory 12b.

In this way, the control unit 24 of FIG. 17 is realized by executing the charge calculation program 40 in cooperation with the memory 12b and the processor 12c. The control unit 24 includes the detection unit 25, the extraction unit 26, the determination unit 27, the calculation unit 28, the display processing unit 29, the traffic monitoring unit 30, and the resource monitoring unit 31, as described above. Further, the storage unit 23 of FIG. 17 is realized by the storage device 12a and the memory 12b.

Further, the communication interface 12d is a communication interface such as a NIC (Network Interface Card) for connecting the information processing device 12 to the network 11. The communication unit 21 of FIG. 17 is realized by the communication interface 12d.

The display device 12e is hardware such as a liquid crystal display device for realizing the display unit 22 of FIG. 17. The calculation result of FIG. 23 and the possibility of the redundant configuration are displayed on the display device 12e. The input device 12f is hardware such as a keyboard and a mouse. For example, the administrator issues various instructions to the information processing device 12 by operating the input device 12f.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A charge calculation method executed by a processor included in a computer to execute a process, the process comprising:
   measuring a first traffic volume input to a first virtual machine, which is included in a plurality of virtual machines that provide a service, within a first predetermined time or measuring a first resource usage rate of the first virtual machine at a first time;
   measuring a second traffic volume input to a second virtual machine, which is included in the plurality of virtual machines, within the first predetermined time or measuring a second resource usage rate of the second virtual machine at a second time;
   determining a degree of possibility that the first virtual machine and the second virtual machine are redundant to each other in the plurality of virtual machines, based on the first traffic volume and the second traffic volume or based on the first resource usage rate and the second resource usage rate;
   calculating a difference between charges for using the service before and after the first virtual machine among the plurality of virtual machines is migrated to another location different from a location where the first virtual machine is located;
   displaying the degree of possibility and the difference with respect to the service; and
   migrating the first virtual machine to the another location when the first virtual machine has a determined degree of possibility of being redundant to the second virtual machine that is lower than a predetermined degree of possibility and the difference is greater than a predetermined difference.

2. The charge calculation method as claimed in claim 1, wherein the service is provided in plural, and the process further comprising:
   determining the degree of the possibility for each of the services;
   calculating the difference of each of the services, where the calculating is performed from the service having lower possibility to the service having higher possibility; and
   stopping the calculating for the service in which the difference is not equal to or less than a predetermined charge.

3. The charge calculation method as claimed in claim 1, wherein the service is provided in plural, and the process further comprising:
   determining the degree of the possibility for each of the services; and
   multiplying a ratio of a number of the plurality of virtual machines to a total number of all the virtual machines included in the service by a coefficient that decreases as the degree of the possibility increases;
   calculating the difference of each of the services, where the calculating is performed from the service having a larger multiplication result of the ratio and the coefficient to the service having a lower multiplication result of the ratio and the coefficient; and
   stopping the calculating for subsequent services in which the difference is not equal to or less than a predetermined charge.

4. The charge calculation method as claimed in claim 1, wherein the service is provided in plural, and the process further comprising:
   calculating the difference of each of the services, where the calculating is performed from the service in which a total number of resources included in the plurality of virtual machines is larger, to the service in which a total number of resources included in the plurality of virtual machines is smaller.

5. The charge calculation method as claimed in claim 1, the process further comprising:
   detecting a reduction in a charge for using another virtual machine, where the another virtual machine is deployed in the another location and has an attribute similar to an attribute of the first virtual machine, by referring to a charge information indicating the charge for using the another virtual machine;
   wherein the calculating is performed when the reduction in the charge for using the another virtual machine is detected.

6. The charge calculation method as claimed in claim 5, wherein
   the attribute is any one of a number of virtual CPUs and a capacity of virtual memory in the virtual machine.

7. The charge calculation method as claimed in claim 1, the process further comprising:
   monitoring the first traffic volume input to the first virtual machine within the first predetermined time;
   monitoring the second traffic volume input to the second virtual machine among the plurality of virtual machines within the first predetermined time; and
   determining the degree of possibility that the first virtual machine and the second virtual machine are redundant to each other, based on a difference between the first traffic volume and the second traffic volume.

8. The charge calculation method as claimed in claim 7, wherein
a fourth virtual machine and a fifth virtual machine are included in the plurality of virtual machines,
the process further comprising:
determining a degree of possibility that the fourth virtual machine and the fifth virtual machine are redundant to each other, based on a difference between a traffic volume flowing between the fourth virtual machine and the first virtual machine within a second predetermined time, and another traffic volume flowing between the fifth virtual machine and the second virtual machine within the second predetermined time, when it is determined that the degree of possibility that the first virtual machine and the second virtual machine are redundant to each other is high.

9. The charge calculation method as claimed in claim 1, the process further comprising:
monitoring the first resource usage rate of the first virtual machine at the first time;
monitoring the second resource usage rate of the second virtual machine among the plurality of virtual machines at the second time; and
determining the degree of possibility that the first virtual machine and the second virtual machine are redundant to each other, based on a difference between the first resource usage rate and the second resource usage rate.

10. The charge calculation method as claimed in claim 1, wherein
a third virtual machine is included in the plurality of virtual machines, and the process further comprising:
monitoring an input traffic volume input to the third virtual machine;
monitoring a first output traffic volume output from the third virtual machine to the first virtual machine;
monitoring a second output traffic volume output from the third virtual machine to the second virtual machine; and
determining the degree of possibility that the first virtual machine and the second virtual machine are redundant to each other, based on a difference between the input traffic volume and a total value of the first output traffic volume and the second output traffic volume.

11. A non-transitory computer-readable recording medium storing a program that causes a processor included in a computer to execute a process, the process comprising:
measuring a first traffic volume input to a first virtual machine, which is included in a plurality of virtual machines that provide a service, within a first predetermined time or measuring a first resource usage rate of the first virtual machine at a first time;
measuring a second traffic volume input to a second virtual machine, which is included in the plurality of virtual machines, within the first predetermined time or measuring a second resource usage rate of the second virtual machine at a second time;
determining a degree of possibility that the first virtual machine and the second virtual machine are redundant to each other in the plurality of virtual machines, based on the first traffic volume and the second traffic volume or based on the first resource usage rate and the second resource usage rate;
calculating a difference between charges for using the service before and after the first virtual machine among the plurality of virtual machines is migrated to another location different from a location where the first virtual machine is located;
displaying the degree of possibility and the difference with respect to the service; and
migrating the first virtual machine to the another location when the first virtual machine has a determined degree of possibility of being redundant to the second virtual machine that is lower than a predetermined degree of possibility and the difference is greater than a predetermined difference.

* * * * *